(12) United States Patent
Aoyama et al.

(10) Patent No.: US 7,154,824 B2
(45) Date of Patent: Dec. 26, 2006

(54) STORAGE APPARATUS

(75) Inventors: Nobuhide Aoyama, Kawasaki (JP); Ryota Akiyama, Kawasaki (JP); Yasuaki Morimoto, Kawasaki (JP); Tetsuo Hosokawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 10/885,957

(22) Filed: Jul. 7, 2004

(65) Prior Publication Data

US 2004/0240326 A1 Dec. 2, 2004

Related U.S. Application Data

(63) Continuation of application No. PCT/JP03/00146, filed on Jan. 10, 2003, and a continuation of application No. PCT/JP02/00159, filed on Jan. 11, 2002.

(51) Int. Cl.
G11B 15/52 (2006.01)

(52) U.S. Cl. ................... 369/47.5; 369/47.19
(58) Field of Classification Search ............. None
See application file for complete search history.

(56) References Cited

U.S. PATENT DOCUMENTS

| 5,031,162 | A | 7/1991 | Morimoto et al. | |
| 5,218,599 | A | 6/1993 | Tsuyoshi et al. | 369/275.1 |
| 5,251,196 | A | 10/1993 | Morimoto et al. | |
| 5,550,800 | A | 8/1996 | Zucker | 369/116 |
| 5,715,232 | A | 2/1998 | Chikazawa et al. | 369/275.2 |
| 6,956,810 | B1* | 10/2005 | Noda | 369/275.3 |
| 6,982,110 | B1* | 1/2006 | Kamezaki et al. | 428/64.1 |

FOREIGN PATENT DOCUMENTS

| EP | 0 309 721 | 4/1989 |
| JP | 1-107352 | 4/1989 |
| JP | 01-166350 | 6/1989 |
| JP | 2-091841 | 3/1990 |
| JP | 2-244445 | 9/1990 |
| JP | 3-058335 | 3/1991 |
| JP | 5-325290 | 12/1993 |
| JP | 6-202820 | 7/1994 |
| JP | 6-215430 | 8/1994 |
| JP | 7-057324 | 3/1995 |

(Continued)

OTHER PUBLICATIONS

Y. Chikazawa et al.; One Method of Realization Relating to a Concurrent ROM-RAM Optical Disk; Journal of the Institute of Television Engineers of Japan; vol. 46, No. pp. 1319-1324; 1992.

Primary Examiner—Paul Huber
(74) Attorney, Agent, or Firm—Greer, Burns & Crain, Ltd.

(57) ABSTRACT

A storage apparatus, capable of record or reproduce of an optical information recording medium in which ROM information is recorded with phase pits and RAM information is recorded on top of a recording region of the phase pits, has a main controller that, when the output of the recording information detection system—a system for detecting reflected light of a laser beam from the optical information recording medium and generating signals corresponding to ROM and RAM information—simultaneously contains ROM and RAM signals corresponding to ROM and RAM information, performs negative feedback control of a semiconductor laser emission using ROM signal in the output of the recording information detection system and performs control so as to obtain read-out and played-back ROM signal from the output of an optical intensity detection system for detecting the intensity of the laser light.

12 Claims, 28 Drawing Sheets

FOREIGN PATENT DOCUMENTS

| | | |
|---|---|---|
| JP | 07-065375 | 3/1995 |
| JP | 8-069659 | 3/1996 |
| JP | 8-255350 | 10/1996 |
| JP | 9-022531 | 1/1997 |
| JP | 11-312363 | 11/1999 |
| JP | 3025272 | 1/2000 |

* cited by examiner

FIG. 11

| | LD FEEDBACK SIGNAL | ROM DETECTION | RAM DETECTION |
|---|---|---|---|
| ROM & RAM PLAYBACK | ROM1 | ROM2 | RAM |
| ROM PLAYBACK ONLY | ROM2 | ROM1 | — |
| WRITE | ROM2 | ROM1 | — |

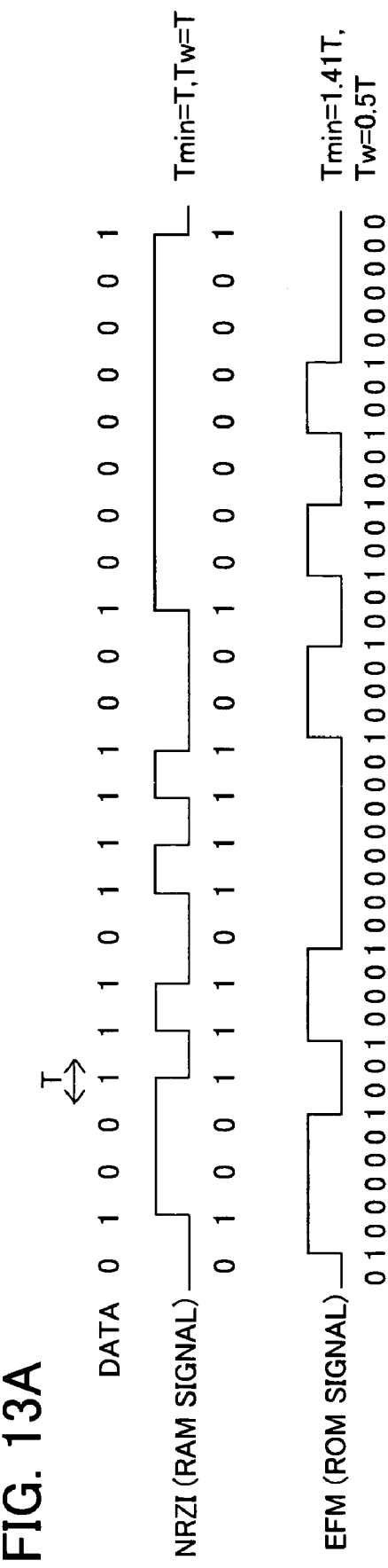

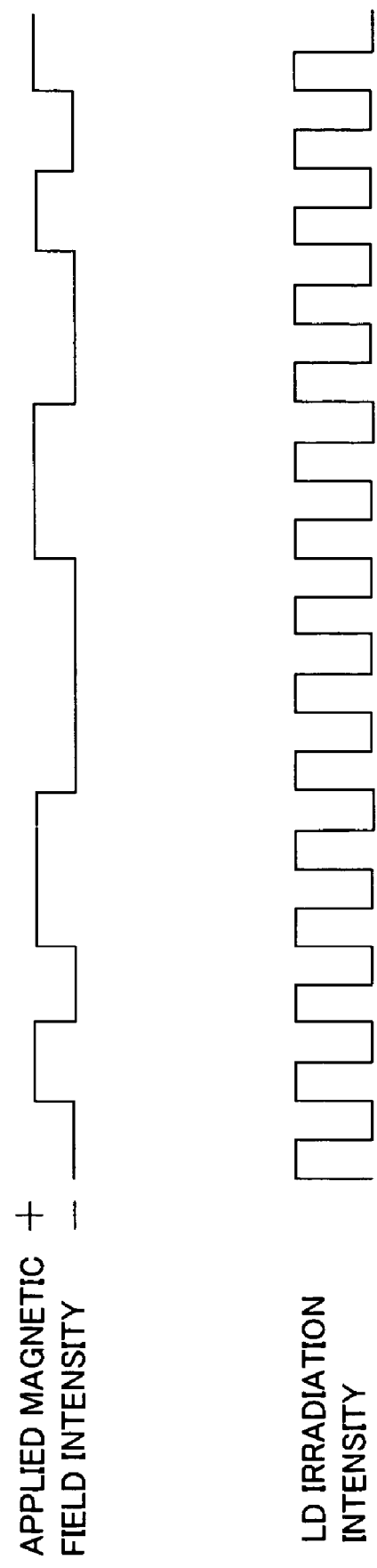

FIG. 15A  PULSED EMISSION
FIG. 15B  CONTINUOUS EMISSION

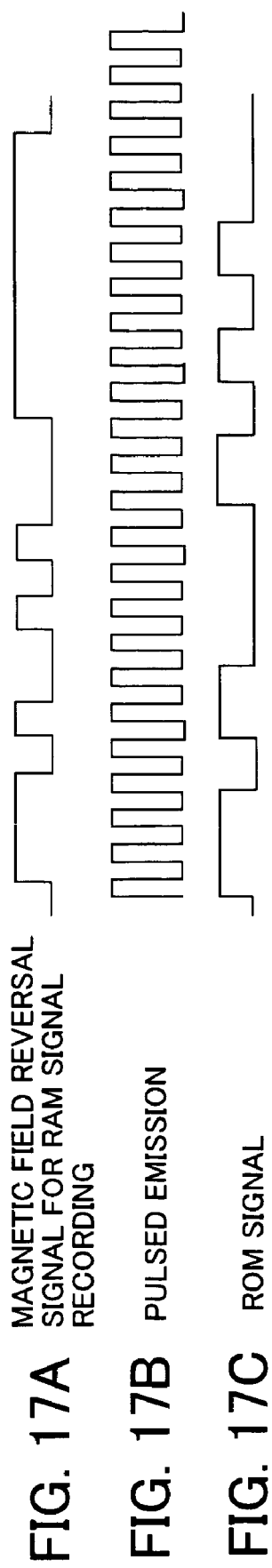
FIG. 17A MAGNETIC FIELD REVERSAL SIGNAL FOR RAM SIGNAL RECORDING
FIG. 17B PULSED EMISSION
FIG. 17C ROM SIGNAL

FIG. 20

| | ROM CNR (dB) | ROM NOISE LEVEL (dBm) | RAM CNR (dB) | RAM NOISE LEVEL (dBm) |
|---|---|---|---|---|
| CONVENTIONAL EXAMPLE | 46 | -54.0 | 43.5 | -58.0 |
| EMBODIMENT | 47.5 | -55.3 | 44.8 | -59.2 |

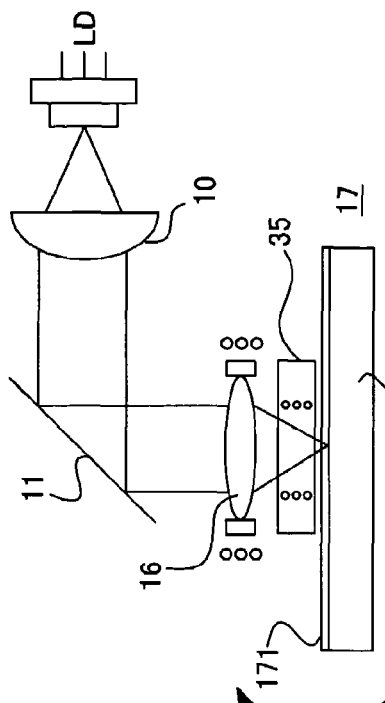
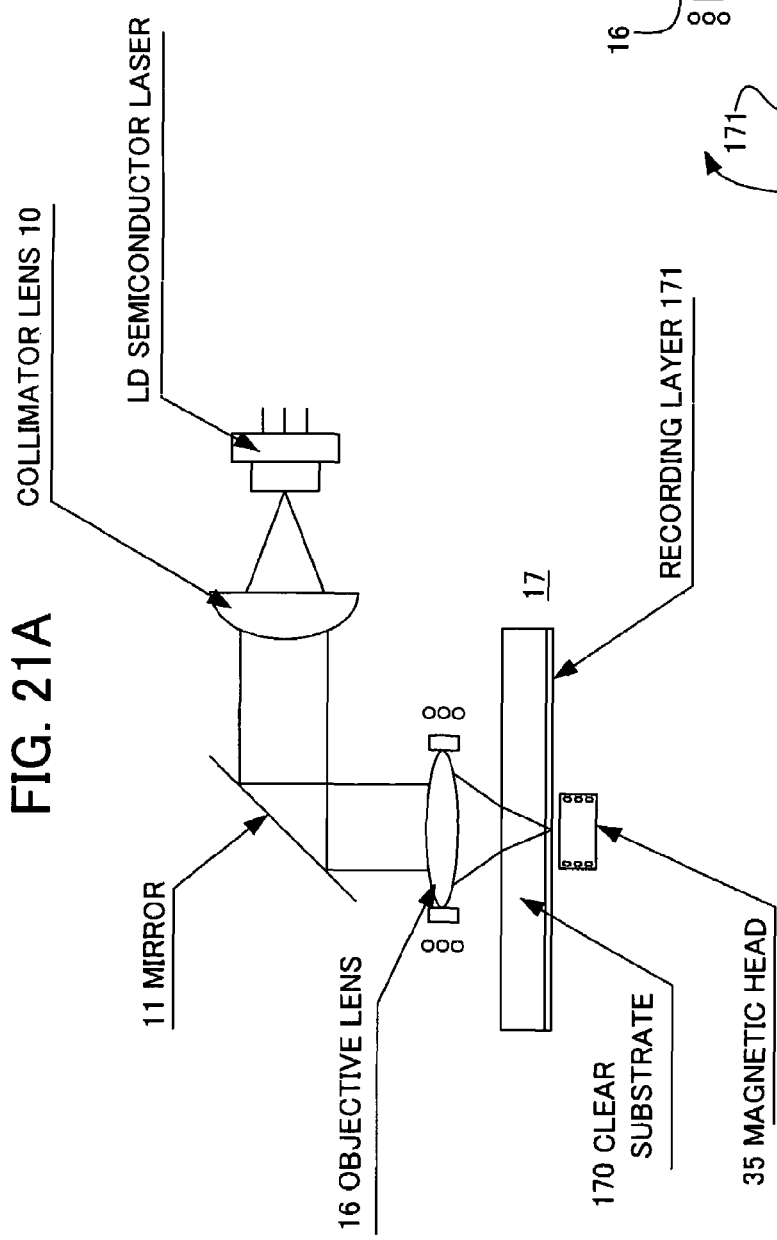
FIG. 21A
FIG. 21B

FIG. 25

| PAHSE<br>PIT MODULATION | 12% | 15% | 20% | 25% | 30% |
|---|---|---|---|---|---|
| ROM<br>JITTER | 18ns | 20ns | 25ns | 32ns | 40ns |
| RAM<br>JITTER | 40ns | 32ns | 28ns | 25ns | 23ns | ns # STORAGE APPARATUS

This is a continuation of International PCT Application Nos. PCT/JP02/00159, filed Jan. 11, 2002, and PCT/JP03/00146 filed Jan. 10, 2003.

BACKGROUND OF THE INVENTION

1. Technical Field of the Invention

The present invention relates to a storage apparatus. More particularly, the present invention relates to a storage apparatus capable of at least record or reproduction, which is compatible with optical information recording media capable of the concurrent ROM-RAM reproduction.

2. Prior Art

Today, research and development are being actively advanced in terms of high-density recording/reproducing and high-speed accessing for magneto-optical disk memory. FIG. 1 shows a recording medium conforming with the ISO standard and, more specifically, a plan view of a magneto-optical disk as an example. A read-in 1 and a read-out 2 provide ROM information consisting of phase pits according to a principle that pits and projections formed on a polycarbonate substrate are reflected using a reflection film, and information such as specifications of the disk is recorded in them. An apparatus controls conditions for recording/reproducing by reading the information.

The optical depth (pit depth) of the phase pit providing this ROM information is set such that beam intensity modulation during reproduction is maximized. Generally, the depth is set such that the degree of modulation (i.e. the ratio of variation of the beam intensity at a phase pit potion to the beam intensity of a flat portion on which no groove, pit or projection is formed) is 70% or above.

Between the read-in 1 and the read-out 2, there is a user area 3 where a magneto-optical recording film is formed by a sputtering apparatus. A user can record freely information in the user area 3.

FIG. 2 shows a portion of an enlarged plan view of the user area 3. Each land 5 sandwiched respectively by grooves 4 to be tracking guides has phase pits 8 constituting a header portion 6 and a user data portion 7. Information on the header portion 6 consists of a sector mark, a VFO, an ID, etc. according to a sector format.

The user data portion 7 consists of the plane lands 5 and each sandwiched respectively by grooves 4, and records a magneto-optical signal. Recording of a magneto-optical signal is executed by supporting the magnetization inversion using heating by a laser beam on the magneto-optical recording film, inverting the direction of magnetization in response to signals.

FIG. 3 shows a conceptual structure of a cross-section of the user area along the direction of a radius, i.e., along the line A-B in FIG. 2. The user area is constituted by stacking a substrate A made from polycarbonate etc., a dielectric film B, a magneto-optical recording film C made from TbFeCo etc., a dielectric film D, an Al film E and a UV-cured film F as a protecting layer.

FIG. 3 is prepared by amending FIG. 2, according to a recent magneto-optical disk. That is, in FIG. 3, in order to execute magneto-optical recording also in area of the grooves 4, the groove is shown to have a same width as the width of the area of the land 5 in the direction of the radius.

When recorded information is read out, when a weak laser beam is radiated, the orientation of the polarization plane of the laser beam is varied in response to the direction of magnetization of the recording layer under polar Kerr effect, and whether data exist or not is determined from whether the polarized component of a reflected beam at this time is strong or weak. Thereby, reading out of RAM information is possible.

Research and development for utilizing such characteristics of the magneto-optical disk memory are advanced. For example, the Japanese Patent Application Laid-Open Publication No. 1994-202820 and a report in the Journal of the Television Society, vol. 46, No. 10, pp. 1319–1324 (1992) disclose a concurrent ROM (Read Only Memory)-RAM (Random Access Memory) optical disk capable of being reproduced concurrently (hereinafter, referred to as "optical information recording medium").

Such an optical information recording ROM-RAM medium capable of being reproduced concurrently has a cross-sectional structure along the direction of the radius shown in FIG. 4 and is constituted, as an example, by stacking the substrate A made from polycarbonate etc., the dielectric film B, the magneto-optical recording film C made from TbFeCo etc., the dielectric film D, the Al film E and the UV-cured film F as a protecting layer.

In the optical information recording medium having such a structure, as shown in FIG. 5, ROM information is recorded fixedly by phase pits PP and RAM information is recorded on rows of the phase pits PP with magneto-optical recording OMM. A cross-section along the A-B line in the direction of the radius in FIG. 5 coincides with the view of FIG. 4.

In an example shown in FIG. 5, grooves shown in FIG. 2 and FIG. 3 are not provided since the rows of phase pit PP are tracking guides in this case.

For such an optical information recording medium having the ROM information and the RAM information on the same recording surface, there are many problems for reproducing concurrently the ROM (for reading out only) information consisting of the phase pits PP and the RAM (writable/rewritable) information consisting of Optical Magnetic Memory (OMM). First, in order to reproduce the RAM information stably with the ROM information, it is necessary to reduce the optical intensity modulation occurring when the ROM information is being read out.

Thus, in the above conventional technique, an optical intensity modulation signal of ROM information read-out is reduced by negative feedback to a driving laser (hereinafter, referred to as "MPF [Modulated Power Feedback]).

However, when the degree of the optical intensity modulation is high, the above conventional technique is not satisfactory. That is, the reproducing margin is also reduced if the optical intensity modulation is reduced too much.

Further, an example of configuration shown in FIG. 6, described in the Japanese Patent Application Laid-Open Publication Nos. 1989-166350 and 1995-65375 and in the above report of Journal of the Television Society, is known as a conventional storage apparatus for the aforementioned optical information recording medium with MPF.

In a brief description of such a configuration, laser beam, a light beam emitted from a semiconductor laser diode LD that serves as a light source, is converted to parallel luminous flux by a collimator lens 10.

Next, the converted parallel luminous flux enters a polarizing beam splitter 11. After passing through the polarizing beam splitter 11, the flux is reduced roughly to the diffraction limit by an objective lens 16 and irradiated to an optical information recording medium 17. The optical information recording medium 17 is rotated by a motor 18. Further, the luminous flux reflected by the optical information recording medium 17 enters the polarizing beam splitter 11 again via the objective lens 16, where the flux is reflected and guided into a servo optical system and a recording information detection system.

That is, light from the optical information recording medium 17 reflected by the polarizing beam splitter 11 enters a second polarizing beam splitter 19, and transmitted light therefrom enters the servo optical system, whereas light reflected by the second polarizing beam splitter 19 enters the recording information detection system.

Transmitted light from the second polarizing beam splitter 19 enters a 4-part photodetector 22 via a condensing lens 20 and a cylindrical lens 21 in the servo optical system, and the light undergoes photoelectric conversion in the 4-part photodetector 22.

Using the output of the 4-part photodetector 22 following photoelectric conversion, focus error sensing (FES) is conducted by a generator circuit 23 of astigmatic focus error detection. At the same time, track error sensing (TES) is conducted by a generator circuit 24 of push-pull method.

Detected focus error signal (FES) and track error signal (TES) are used for tracking feedback control via an FES/TES actuator 37.

In the recording information detection system, on the other hand, reflected laser light enters a 2-beam wollaston 26 splitting into two beams, orthogonal to each other, based on the polarization characteristic of reflected laser light that changes according to the orientation of the magneto-optical records on the optical information recording medium 17. The beams enter a 2-part photodetector 28 via a condensing lens 27, where each undergoes photoelectric conversion.

On the one hand, two electric signals resulting from photoelectric conversion in the 2-part photodetector 28 are added together by a summing amplifier 29 and further guided into an LD controller 100, whereas, on the other hand, they are subtracted from each other by a subtracting amplifier 30 to be a RAM readout signal (RAM).

The output of the summing amplifier 29 guided into the LD controller 100 is output from the LD controller 100 as LD drive current. Monitoring this drive current allows detection of ROM signal.

In detecting ROM and RAM signals, at this time, a circuit is added in the configuration of the LD controller 100 shown in FIG. 7 to superpose a high-frequency signal 101 at several hundred MHz range on the LD drive current, thus eliminating noise caused by returned light from the optical information recording medium 17.

For this reason, an LD drive circuit (not shown in the figure) provided in the LD must be capable of pass radio drive current from the LD controller 100. During ROM signal detection, the signal passes through an amplifier 102 for detection to minimize changes in frequency characteristic of the LD drive circuit. However, complete elimination of effects on the LD circuit frequency characteristic is difficult. Therefore, the configuration of the conventional storage apparatus shown in FIG. 6 faces a problem of ROM and RAM signal characteristic degradation.

DISCLOSURE OF THE INVENTION

To address the problems described above, it is an object of the present invention to provide a storage apparatus capable of at least record or reproduction, which avoids effects from optical intensity modulation due to ROM information during concurrent readout of ROM and RAM information, and which is compatible with optical information recording media.

The present inventor recognized, as a result of various studies, the existence of an appropriate value in respect of reduction of optical intensity modulation during readout of ROM information. It is therefore an object of the present invention to provide a storage apparatus capable of at least record or reproduction, which is compatible with optical information recording media capable of stable reproduction of RAM information during the concurrent readout of ROM and RAM information.

It is another object of the present invention to provide a storage apparatus capable of at least record or reproduction that can reduce polarization noise generated by phase pit edges of ROM information, and that is compatible with optical information recording media.

It is still another object of the present invention to provide a storage apparatus that eliminates effects on the frequency characteristic of the LD drive circuit in the aforementioned conventional storage apparatus and that can accurately read out ROM and RAM information.

In order to achieve the above objects, according to the first aspect of the present invention, the storage apparatus is capable of at least record or reproduction of an optical information recording medium in which ROM information is recorded with phase pits and in which RAM information is recorded on top of the recording region of the phase pits, and is comprising a light source for emitting a light beam; a recording information detection system for detecting a reflected light beam by the optical information recording medium and generating signals corresponding to ROM and RAM information; an optical intensity detection system for detecting intensity of the light beam from the light source; a driver for controlling the amount of light beam emission of the light source; and a controller for providing via the driver a negative feedback control of the amount of emission of the light source using ROM signal in the output of the recording information detection system when the output of the recording information detection system simultaneously contains ROM and RAM signals corresponding to ROM and RAM information, and for controlling so as to obtain read-out and reproduced ROM signal from the output of the optical intensity detection system.

The second aspect of the present invention to achieve the above objects is characterized by the storage apparatus capable of at least record or reproduction according to the first aspect, wherein the optical information recording medium is made up of a clear substrate and a magnetic recording film layer formed thereon, the storage apparatus further comprising a head unit having a magnetic head for magnetic recording to the optical information recording medium and an objective lens for focusing the light beam during magnetic recording or reproducing, wherein the magnetic head is located opposite to the side of the magnetic recording film layer of the optical information recording medium, so that a light beam focused with the objective lens is irradiated on the magnetic recording film layer.

The third aspect of the present invention to achieve the above objects is characterized by the storage apparatus capable of at least record or reproduction according to the first aspect, further comprising an error correction control unit that generates an error correction signal by combining ROM information recorded with the phase pits and RAM information to be recorded during RAM information recording, to thereby control magnetic recording thereof on top of the ROM information as the RAM information.

The fourth aspect of the present invention to achieve the above objects is characterized by the storage apparatus capable of at least record or reproduction according to the first aspect, wherein different recording modulation systems are used for the ROM and RAM information.

The fifth aspect of the present invention to achieve the above objects is characterized by the storage apparatus capable of at least record or reproduction according to the fourth aspect, wherein the optical information recording medium is made up of a clear substrate and a magnetic recording film layer formed thereon, wherein magnetic field modulation system is used as a recording modulation system of the RAM information, and wherein recording is performed by irradiating a pulsed light to the magnetic recording film layer.

The sixth aspect of the present invention to achieve the above objects is characterized by the storage apparatus capable of at least record or reproduction according to the first aspect, further comprising a delay processing unit that reproduces a clock from the ROM information and that controls the timing for magnetically recording the RAM information on top of the ROM information with reference to the reproduced clock.

The seventh aspect of the present invention to achieve the above objects is characterized by the storage apparatus capable of at least record or reproduction according to the sixth aspect, wherein the timing for magnetically recording the RAM information is delayed by the delay processing unit by nT+ΔT (where 'n' is an integer including zero, and 'T' is a data bit length) relative to the clock reproduced from the ROM information.

The eighth aspect of the present invention to achieve the above objects is characterized by the storage apparatus capable of at least record or reproduction according to the first aspect, wherein the optical information recording medium subjected to at least record or reproduction comprises a substrate having a ROM region where phase pits serve as ROM information and a magneto-optical recording film for recording RAM information that is formed in a region corresponding to the ROM region of the substrate, with the optical depth of the phase pits being approximately λ/8 to λ/10 (where the λ is the wavelength of the laser used for recording/reproducing), and with modulation of the phase pits being 10% to 37%.

The ninth aspect of the present invention to achieve the above objects is characterized by the storage apparatus capable of at least record or reproduction according to the eighth aspect, wherein the ratio of width of the phase pit to track pitch in the optical information recording medium is roughly 18% to 24%.

In order to achieve the above objects, according to the tenth aspect of the present invention, the storage apparatus is capable of at least record or reproduction of an optical information recording medium which comprises a substrate having a ROM region where phase pits serving as ROM information and a magneto-optical recording film for recording RAM information in a region corresponding to the ROM region of the substrate, with the optical depth of the phase pits being approximately λ/8 to λ/10 (where the λ is the wavelength of the laser used for recording/reproducing), and with modulation of the phase pits being 10% to 37%, the storage apparatus comprising a light source for generating a light beam to be irradiated to the optical information recording medium; a first detection system for detecting ROM signal from reflected light of the light beam from the optical information recording medium; and a second detection system for detecting RAM signal from reflected light of the light beam from the optical information recording medium.

In order to achieve the above objects, according to the eleventh aspect of the present invention, the storage apparatus is capable of at least record or reproduction of an optical information recording medium in which ROM information is recorded with phase pits and RAM information is recorded on top of a recording region of the phase pits, the storage apparatus comprising a light source for emitting a light beam; a recording information detection system for detecting reflected light beam by the optical information recording medium and generating signals corresponding to ROM and RAM information; and a delay processing unit that reproduces a clock from the ROM information and controls the timing for magnetically recording the RAM information on top of the ROM information with reference to the reproduced clock.

The twelfth aspect of the present invention to accomplish the above objects is characterized by the storage apparatus capable of at least record or reproduction according to the eleventh aspect, wherein the timing for magnetically recording the RAM information is delayed by the delay processing unit by nT+ΔT (where 'n' is an integer including zero, and 'T' is a data bit length) relative to the clock reproduced from the ROM information.

Features of the present invention will become apparent from the following embodiments described with reference to the drawings.

BRIEF DESCRIPTION OF THE DRAWINGS

FIG. 11 is a view showing combinations of ROM1, ROM2 and RAM detection in each mode of the main controller 15;

FIGS. 13A and 13B are views showing RAM and ROM signal modulation systems;

FIGS. 14A and 14B are views describing magnetic field modulation of pulse emission by a semiconductor laser diode LD in the present invention;

FIGS. 15A and 15B are views showing the difference in recording mark shape;

FIGS. 17A, 17B, and 17C are timing charts when magnetic field modulation recording by pulsed irradiation is used;

FIG. 20 is a view showing results of comparison of ROM and RAM signals' CNR and noise level between the conventional example and the embodiment according to the present invention;

FIGS. 21A and 21B are views showing optical systems to examine how to irradiate laser beam to the optical information recording medium in the storage apparatus shown in FIG. 8;

FIG. 25 is a table showing that phase pit modulation affects ROM and RAM signal jitters;

BEST MODE FOR CARRYING OUT THE INVENTION

Figure 8:
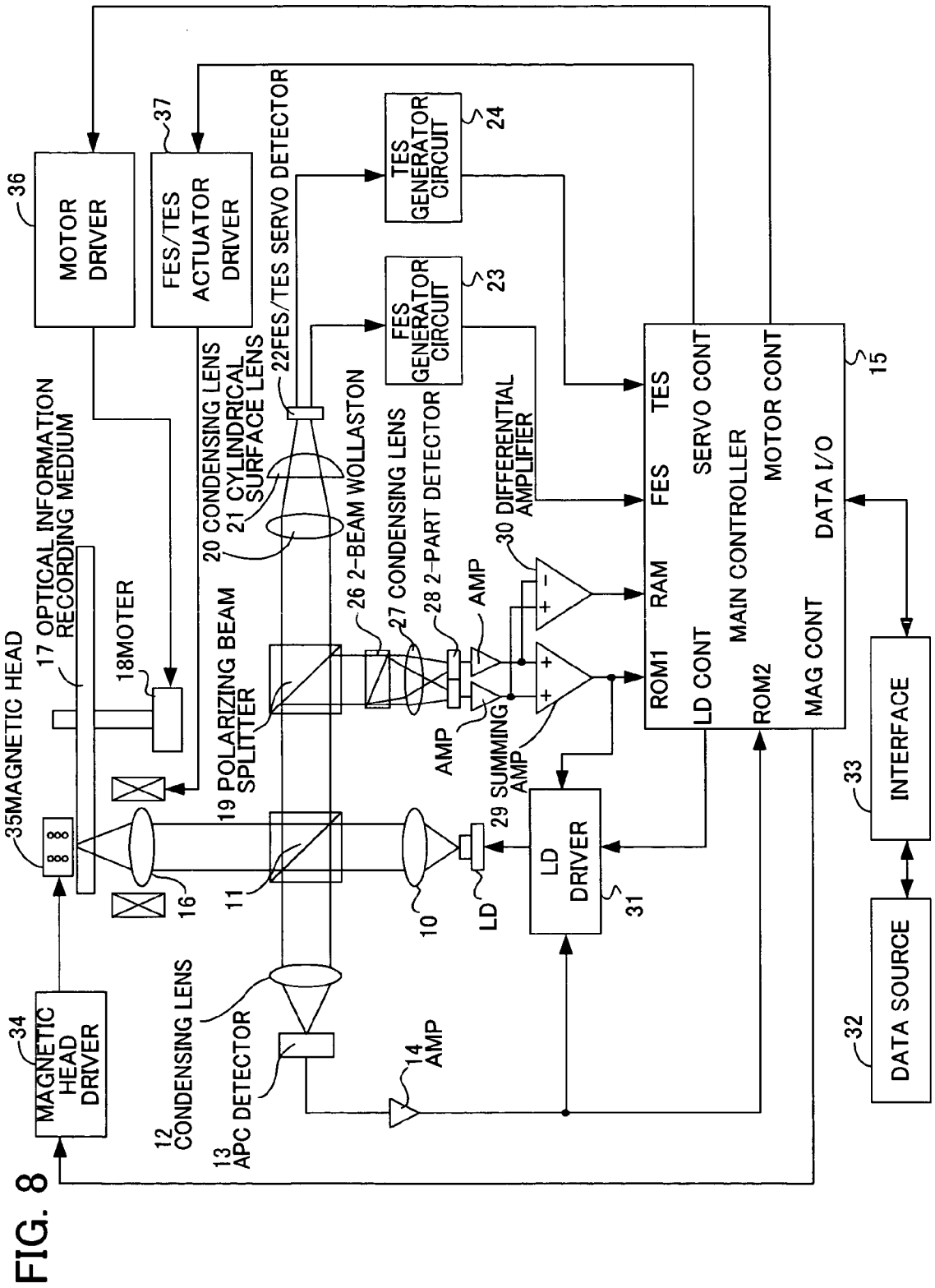
FIG. 8 is a block diagram of an embodiment configuration of a storage apparatus according to the present invention that is compatible with the optical information recording medium.

FIG. 8 is a block diagram of an embodiment configuration of a storage apparatus according to the present invention that is compatible with an optical information recording medium. In FIG. 8, laser beam, a light beam emitted from the semiconductor laser diode LD (wavelength: 785 nm) that serves as a light source, is converted to parallel luminous flux by the collimator lens 10.

Next, the converted parallel luminous flux enters the polarizing beam splitter 11. Light reflected by the polarizing beam splitter 11 is made to enter a photodetector 13 for auto power control (APC) by a condensing lens 12.

As a feature of the storage apparatus according to the present invention, electric signal, that has undergone photoelectric conversion by the photodetector 13 and that is proportional to the emission intensity of the semiconductor laser diode LD, is guided into the main controller 15 and an LD driver 31 via an amplifier 14 for use in APC control or ROM signal reproduction.

On the other hand, after passing through the polarizing beam splitter 11, the flux is reduced roughly to the diffraction limit by the objective lens 16 and irradiated to the optical information recording medium 17. The optical information recording medium 17 is rotated by the motor 18. Further, the luminous flux reflected by the optical information recording medium 17 enters the polarizing beam splitter 11 again via the objective lens 16, where the flux is reflected and guided into the servo optical system and the recording information detection system.

That is, reflected light from the optical information recording medium 17 reflected by the polarizing beam splitter 11 enters a second polarizing beam splitter 19, and transmitted light therefrom enters the servo optical system, whereas light reflected by the second polarizing beam splitter 19 enters the recording information detection system.

Transmitted light from the second polarizing beam splitter 19 enters the 4-part photodetector 22 via the condensing lens 20 and the cylindrical lens 21 in the servo optical system, undergoing photoelectric conversion in the 4-part photodetector 22.

Using the output of the 4-part photodetector 22 following photoelectric conversion, focus error sensing (FES) is conducted by the generator circuit 23 through astigmatic focus error detection. At the same time, track error sensing (TES) is conducted by the generator circuit 24 through push-pull method.

Figure 9:
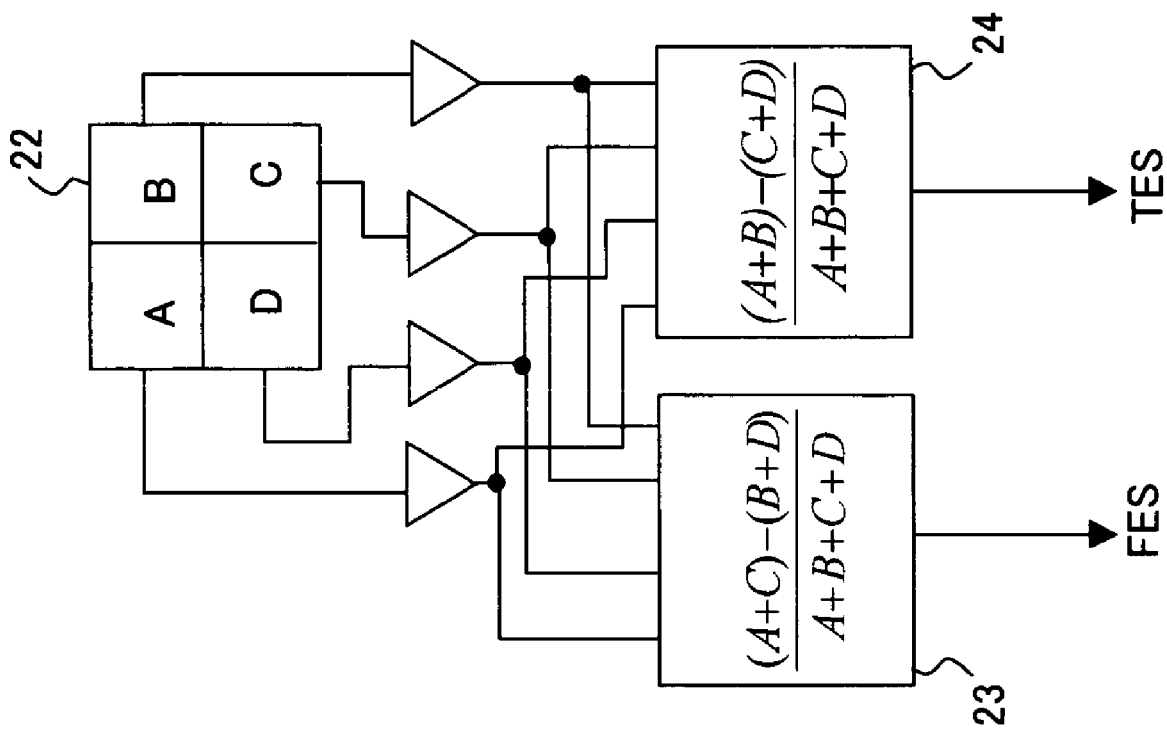
FIG. 9 is a view describing focus error sensing (FES) and track error sensing (TES) methods using a 4-part photodetector 22 and based on its output.

FIG. 9 shows the relationship between the 4-part photodetector 22, the generator circuit 23 based on astigmatic focus error detection for performing focus error sensing (FES) and the generator circuit 24 based on push-pull method for performing track error sensing (TES), with both circuits performing sensing based on the output of the photodetector.

The generator circuit 23 based on astigmatic focus error detection for performing focus error sensing (FES) calculates focus error signal (FES) of a control error along the optical axis of the objective lens 16 from the following equation:

$$FES = \frac{(A+C)-(B+D)}{A+B+C+D}$$

(Where A, B, C, and D are transmitted lights from the second polarizing beam splitter 19, split into four by the 4-part photodetector 22)

On the other hand, the generator circuit 24 based on push-pull method for performing track error sensing (TES) calculates track error signal (TES) of a control error in the direction perpendicular to the optical axis of the objective lens 16, from the following equation:

$$TES = \frac{(A+B)-(C+D)}{A+B+C+D}$$

Focus error signal (FES) and track error signal (TES) found from these calculations are fed to the main controller 15.

In the recording information detection system, reflected laser light enters the 2-beam wollaston 26 of the recording information detection system, converting the polarization characteristic of reflected laser beam—a characteristic that changes according to the orientation of the magneto-optical records on the optical information recording medium 17—into optical intensity.

That is, reflected laser light is split into two beams, whose polarization direction is orthogonal to each other, by the 2-beam wollaston 26 due to polarization detection, causing the beams to enter the 2-part photodetector 28 via the condensing lens 27 for photoelectric conversion of each.

Two electric signals resulting from photoelectric conversion in the 2-part photodetector 28 are added together by the summing amplifier 29 to serve as a first ROM signal (ROM1), while at the same time they are subtracted from each other by the subtracting amplifier 30 to serve as the RAM readout signal (RAM), with both signals fed to the main controller 15.

The description has so far focused primarily on the flow of luminous flux during readout. Next, a description will be given of the flow of output signals from the photodetectors with reference to a detailed configuration example of the main controller 15 shown in FIG. 8.

Figure 10:
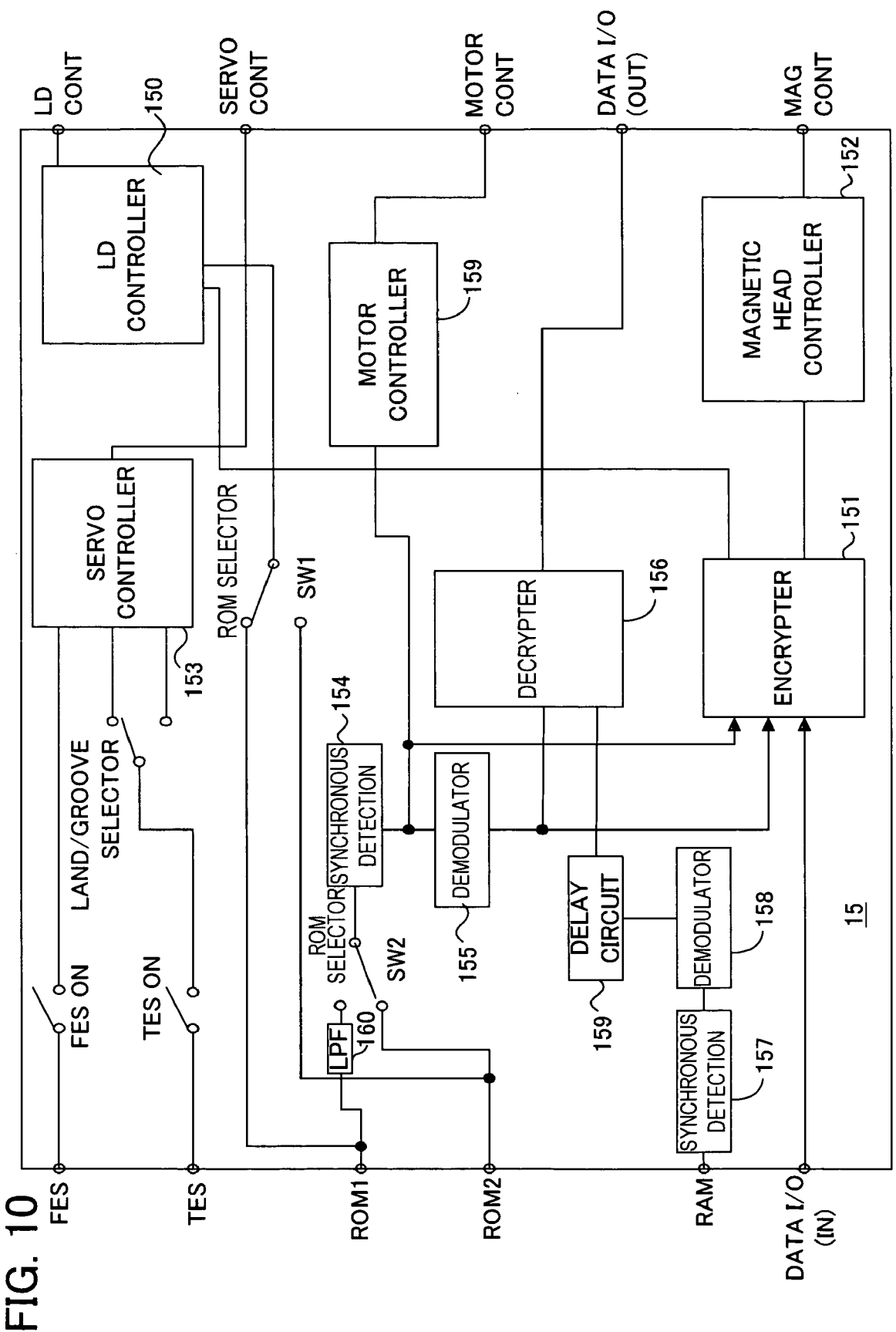
FIG. 10 is a view showing a detailed configuration example of a main controller 15.

In FIG. 10, the main controller 15 receives, as an input and via the amplifier 14, a second ROM signal (ROM2) resulting from photoelectric conversion of reflected light from the semiconductor laser diode LD that enters the APC photodetector 13.

Further, as described earlier, the main controller 15 receives, as inputs, the first ROM signal (ROM1)—the output of the summing amplifier 29, a RAM signal (RAM)—the output of the differential amplifier 30, the focus error signal (FES) from the FES generator circuit 23 and the track error signal (TES) from the TES generator circuit 24.

Moreover, recording data and read-out data are exchanged with a data source 32 via an interface circuit 33.

The first ROM signal (ROM1), the second ROM signal (ROM2) and the RAM signal (RAM) input to the main controller 15 are detected for use in accordance with the modes, namely, concurrent ROM and RAM reproduction, ROM reproduction only and recording (WRITE).

FIG. 11 is a view showing combinations of ROM1, ROM2 and RAM detection in individual modes. The main controller 15 shown in FIG. 10 has ROM selector switches SW1 and SW2 for such combinations of ROM1, ROM2 and RAM detection in individual modes.

The states of the ROM selector switches SW1 and SW2 shown in FIG. 10 are during ROM and RAM reproduction among the modes shown in FIG. 11. During ROM reproduction only and recording, the states of the ROM selector switches SW1 and SW2 shown in FIG. 10 are individually inverted.

An LD controller 150 within the main controller 15 generates a command signal for the LD driver 31 in response to outputs of the encrypter 151 and the ROM selector switch SW1.

The LD driver 31 performs, in the case of ROM and RAM reproduction, negative feedback control of emission power of the semiconductor laser diode LD in accordance with the first ROM signal (ROM1) and does so, in the case of ROM reproduction alone and recording, in accordance with the second ROM signal (ROM2).

During magneto-optical recording, data from the data source 32 is input to the main controller 15 via the interface 33 (refer to FIG. 8). In the main controller 15, this input data is encrypted by the encrypter 151 for security purposes and then supplied to a magnetic head driver 34 via a magnetic head controller 152 as recording data.

The main controller 15 here is exemplified by an all-in-one LSI configuration that includes MPU, DSP, encoder/decoder, etc. and is capable of comprehensively controlling reproducing/recording function, servo function, laser emission control and others.

At this time, the encrypter 151 may be configured to combine the ROM signal, demodulated by a demodulator 155, with input data for encryption, if enhanced security is desired.

The magnetic head driver 34 drives a magnetic head 35, modulating the magnetic field correspondingly with encrypted recording data. At this time, a signal indicating the moment for recording is sent from the encrypter 151 in the main controller 15 to the LD driver 31, which performs negative feedback control of emission of the semiconductor laser diode LD for the laser power optimization according to the second ROM signal (ROM2).

It is to be noted that the following embodiments may be used for enhanced security or stable signal recording/reproducing in respect of ROM and RAM signal recording:

That is, an error correction signal, generated by combining ROM and RAM signals, is recorded to the magneto-optical recording film as the RAM signal.

At least either of ROM and RAM signals is encrypted and recorded on a corresponding ROM region or the magneto-optical recording film, and the decryption method for the encryption is recorded at least in the ROM region or the magneto-optical recording film.

Alternatively, at least part of the magneto-optical recording film that records RAM signal is write-protected by users. To achieve this, the main controller 15 records a given identification ID in advance to part of the RAM region, managing media formats such that this recording region is excluded from rewritable logic sectors. This renders the identification ID readable only. The identification ID can be used in various applications where equipment types are distinguished for personal, medical and other purposes.

These embodiments can be controlled by firmware in the encrypter 151.

Figure 12:
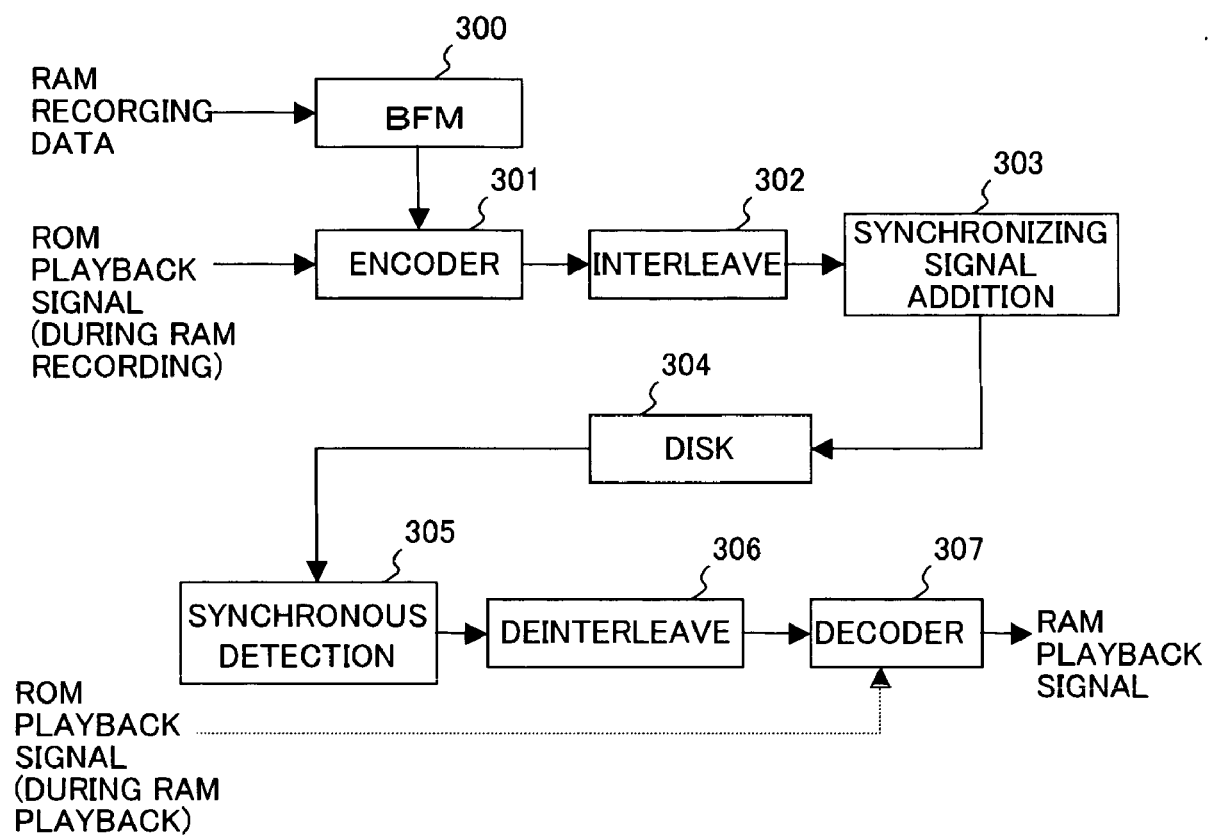
FIG. 12 is a view describing a configuration of an encrypter 151 and a decrypter 156 and an example of their processings.

FIG. 12 is a view describing a configuration of the encrypter 151 and a decrypter 156 and an example of their processings.

In the encrypter 151, digital RAM signal—RAM recording data to be magneto-optically recorded—is fed to an encoder 301 via a buffer memory 300 together with ROM signal reproduced by the demodulator 155. In the encoder 301, encoding is performed for encrypting RAM signal using ROM signal.

RAM signal can be encrypted using ROM signal in various ways. For instance, it is possible to mix these signals and use the mixed signal as an encrypted RAM signal for recording to the magneto-optical recording film, regarding ROM and RAM signals respectively as R and L channels as in generating stereo audio. At this time, since ROM signal is originally stationarily recorded in the land regions with pit phases, it is preferred that the signals be mixed with reduced R channel information.

Figure 1:
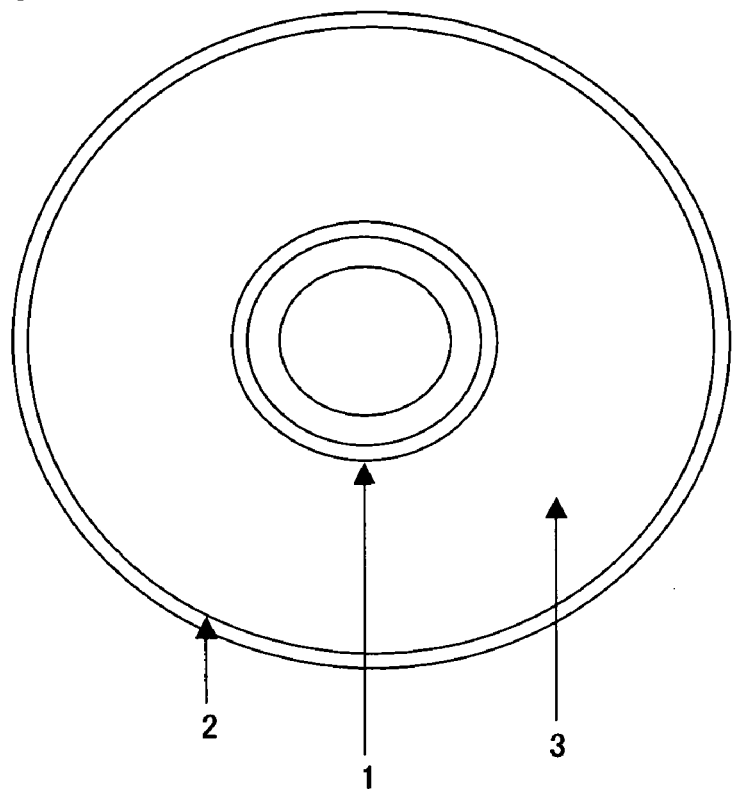
FIG. 1 is a plan view of a magneto-optical disk as an example of ISO Standard-compliant medium.

This allows for encryption not possible with an ordinary RAM signal recording medium as shown in FIG. 1.

Alternatively, simplified encryption is possible by inserting one bit of ROM signal every given bits of RAM signal in the encoder 301.

The output of the encoder 301 is fed to an interleave circuit 302 that performs interleaving by which serial bit strings—output of the encoder 301—are changed by given rules. This is intended to ensure randomness in terms of positive and negative signs.

Next, the signal is synchronized with clock signal reproduced from ROM signal and then converted to NRZI signal by a synchronization/conversion circuit 303 for use as RAM recording information.

The RAM recording information is, as described later, magneto-optically recorded on top of and correspondingly with the ROM recording region that is stationarily recorded in the land regions of the magneto-optical information recording medium with pit phases.

RAM signal read from the magneto-optical information recording medium, which is to be input to the decrypter 156, undergoes inverse processes of the synchronization/conversion circuit 303, the interleave circuit 302, and the encoder 301 of the encrypter 151, respectively in the demodulator 305, in the deinterleave circuit 306, and in the decoder 307, so that decrypted RAM signal be obtained.

The above configuration also allows combining ROM and RAM signals in error correction. As shown by the broken line arrow in FIG. 12, for example, part of ROM reproduction signal is used during RAM signal reproduction in the decrypter 156 for error correction.

In the encoder 301, for instance, one bit extracted from ROM signal is combined with RAM signal and output as RAM information, with this information recorded together to the ECC (Error Check Code) portion at the end of the data portion during RAM information recording. Performing parity check with the decoder 307 during reproduction enables error correction through combined use of ROM and RAM signals.

Here, recording modulation system in magnetic field modulation recording is examined. As illustrated in FIGS. 13A and 13B, we assume that the modulation system used for ROM signal recording is EFM (Eight to Fourteen Modulation), and that the modulation system for RAM data to be magneto-optically recorded is NRZI (NonReturn-to-Zero change-on-Ones recording).

In this case, in NRZI (FIG. 13A) both Tmin and Tw equal to T, whereas in EFM (FIG. 13B) Tmin and Tw respectively equals to 1.41T and 0.47T (where T is an original data bit length, Tmin is a shortest mark, and Tw is a window margin width).

For RAM signal, with its limited frequency characteristic of magnetic field modulation write signal, a configuration with the large window margin width Tw and the long shortest mark Tmin is suitable. For ROM signal, on the other hand, EFM having the long shortest mark Tmin is suitable. It is therefore preferred in the present invention that suitable and different recording modulation systems be used respectively for RAM and ROM signals.

Further, in common magnetic field modulation systems, information is recorded by maintaining the irradiation power of the semiconductor laser diode LD constant and reversing the magnetic field. In the present invention, in contrast, the semiconductor laser diode LD emits pulsed light (FIG. 14B), and further the magnetic field applied is changed correspondingly with the signal (FIG. 14A) as shown in FIGS. 14A and 14B that describe magnetic field modulation for emission of pulsed light from the semiconductor laser diode LD.

This changes the temperature distribution of the magneto-optical information recording medium during magneto-optical recording in FIGS. 15A and 15B showing the difference in recording mark shape, resulting in a magneto-optical recording mark as shown in FIG. 15A. It is apparent that the arrow feather shape is moderated as compared with that in conventional recording by continuous emission from the semiconductor laser diode LD (FIG. 15B). Moderation of the arrow-feather-shaped recording mark can improve the characteristic of the reproduction signal.

A description will be made referring back to FIG. 8. In consideration of use of concurrent readout of ROM and RAM information, it is preferred that the start address of magneto-optical recording correspond to the block address of ROM information. For this reason, clock is reproduced from the first ROM signal (ROM1)—a phase pit signal and the output of the summing amplifier 29—using the synchronous detection circuit 154, thus detecting the recording start address.

A unit comprising the magnetic head 35 and the objective lens 16 is positioned at (made to access) the detected recording start address using a seek mechanism not shown in FIGS. 8 and 10, thus initiating the recording operation.

Based on the clock reproduced from the first ROM signal (ROM1), rotation of the motor 18 is controlled by a motor driver 36 as part of the seek motion via a motor controller 159.

It is to be noted that part of functionality of the seek mechanism may be borne by the motor driver 36 or the TES actuator 37 when the seek distance is short.

Since magneto-optical recording clock is generated from phase pit signal (ROM1) as discussed earlier, the clock is used for synchronization processing. That is, phase pit clock is reproduced by the synchronous detection circuit 154 in the main controller 15, and recording timing of RAM information to be magneto-optically recorded is adjusted by the synchronization/conversion circuit 303 of the encrypter 151 as described earlier with reference to FIG. 12.

Thus, use of the ROM signal clock suppresses variations in recording mark length caused by disk eccentricity during recording.

Figure 16A:
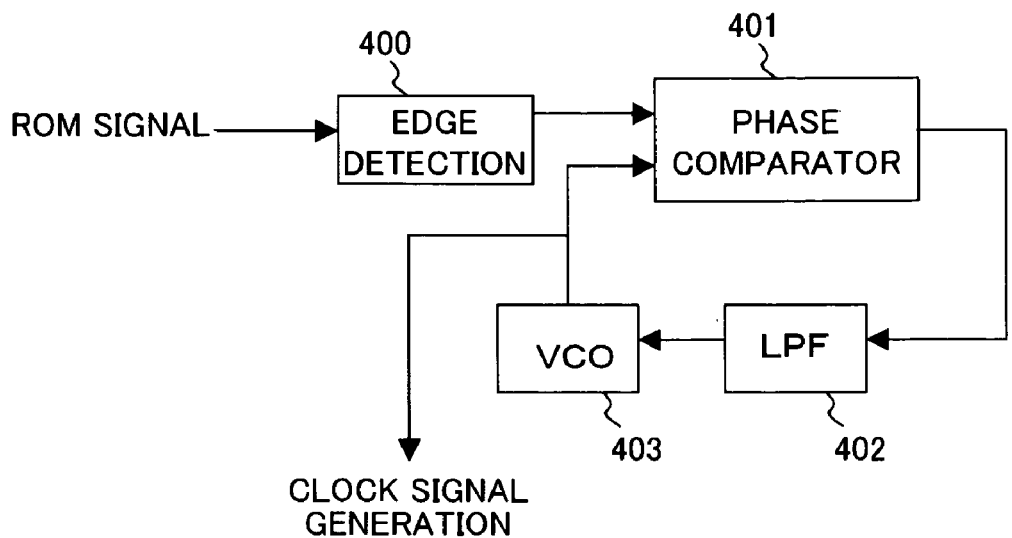
FIGS. 16A and 16B are a configuration example of a synchronous detection circuit 154 in the main controller 15 that reproduces ROM signal clock for synchronization processing.
Figure 16B:
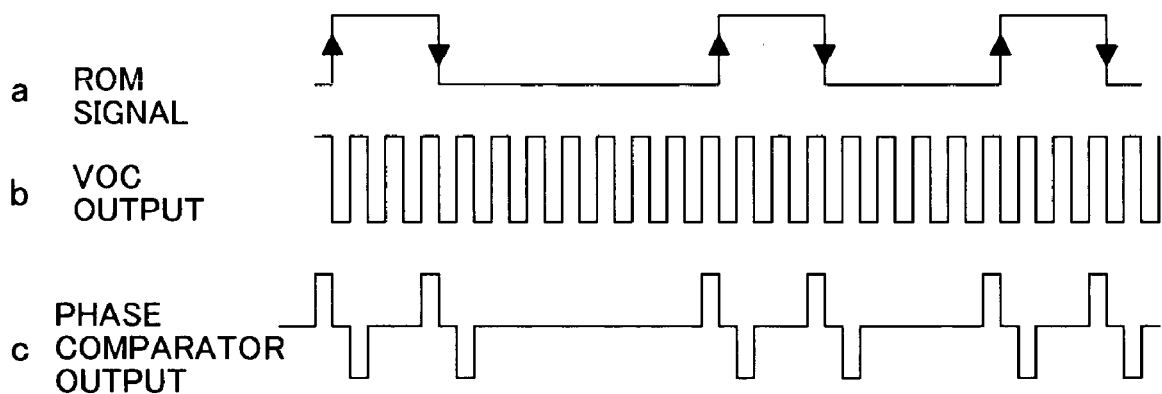

FIGS. 16A and 16B are a configuration example of the synchronous detection circuit 154 in the main controller 15 that reproduces ROM signal clock for synchronization processing. FIG. 16A is a configuration block diagram, whereas FIG. 16B is a view showing timings of individual signals. A given slice level is set in an edge detection circuit 400 for ROM signal (FIG. 16B, a) fed to the synchronous detection circuit 154, thus the edge detection circuit 400 detecting ROM signal edge. Then, an edge detection timing signal is input to a phase comparator 401.

Further, a feedback loop consisting of the phase comparator 401, a low-pass filter 402 and a voltage-controlled oscillator 403 is provided, adjusting the pulse output from the voltage-controlled oscillator 403 relative to the edge detection timing signal. This generates the clock.

That is, a phase comparison output is produced from the phase comparator 401 in response to edges of a ROM signal 'a' in step with a pulse 'b' from the voltage-controlled oscillator 403 in FIG. 16B. If the phases of the pulse from the voltage-controlled oscillator 403 and of the ROM signal deviate, the phase comparison output also deviates, the output of the low-pass filter 402 biasing positive or negative. By taking advantage thereof and feeding back the output of the voltage-controlled oscillator 403, it is possible to generate a clock synchronous with the ROM signal.

Here, the RAM signal is, as described above, write-controlled using a clock obtained from the ROM signal. Further, if magnetic field modulation recording by pulse irradiation is employed, the relationship shown in the timing charts of FIGS. 17A, 17B and 17C will result as described with reference to FIGS. 14A, 14B, 15A and 15B. That is, magnetic field reversal signal for RAM signal recording (FIG. 17A) and pulse emission by the semiconductor laser diode LD (FIG. 17B) are synchronous with the ROM signal (FIG. 17C).

Figure 18:
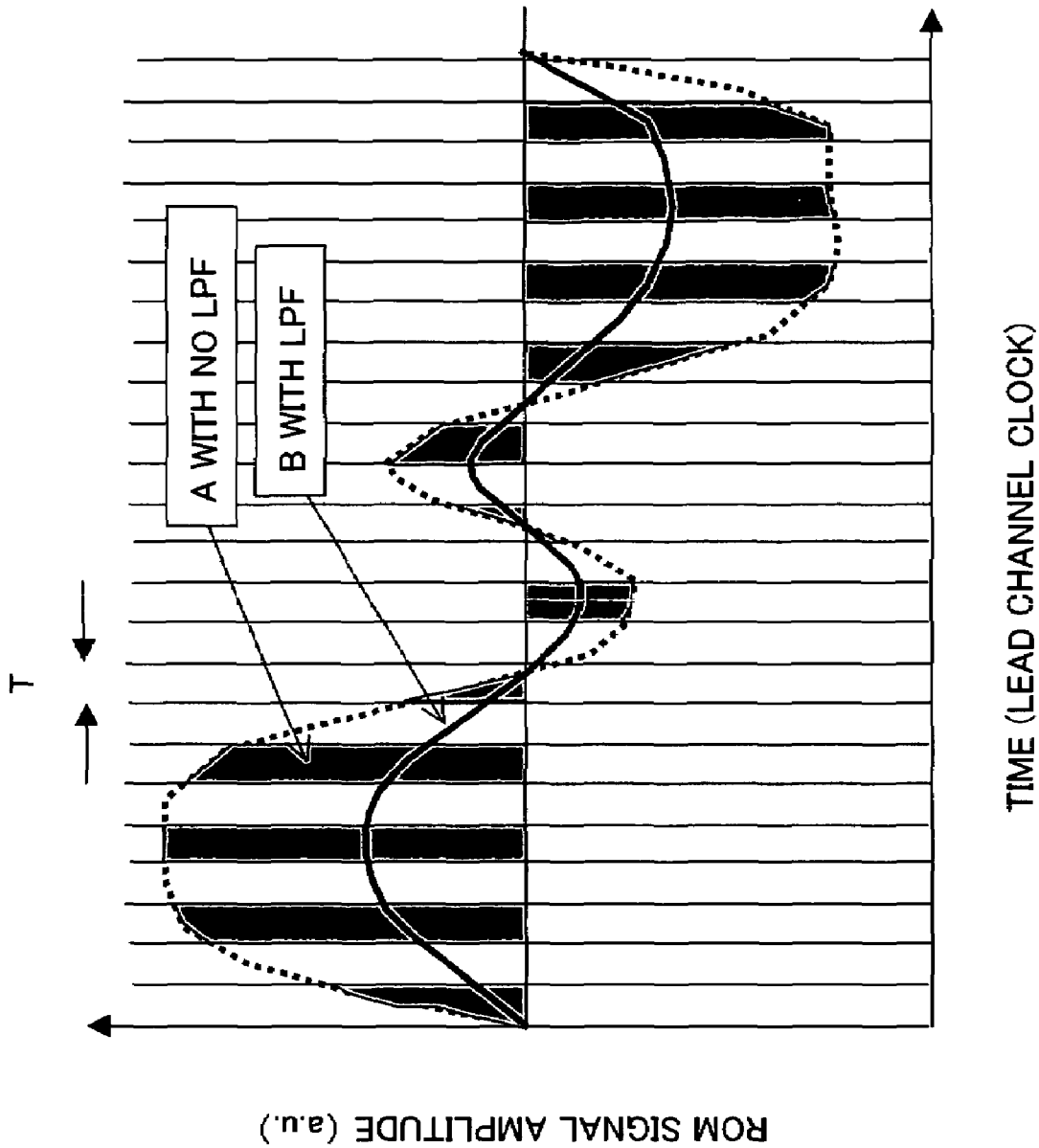
FIG. 18 is a view describing impact of pulsed emission on ROM signal in magnetic field modulation recording by pulsed irradiation.

In actuality, however, an impact of pulse emission emerges in the ROM signal as shown in FIG. 18, resulting in ROM signal amplitude variations (amplitude waveform A in FIG. 18). To prevent this, therefore, the main controller 15 shown in FIG. 10 is provided with a low-pass filter 160. This makes it possible to suppress impact of pulsed emission in FIG. 18, reducing variations in ROM signal amplitude as shown in an amplitude waveform B.

A description will be given next of reproduction operation. It has already been discussed that optical intensity modulation caused by phase pit signal, namely, ROM information to be read out, turns into noise for RAM signal.

As with the method employed in the prior art shown earlier, therefore, it is possible to reduce and flatten the first ROM signal (ROM1) by negatively feeding back the first ROM signal (ROM1) from the summing amplifier 29 to the semiconductor laser diode LD via the LD driver 31 and by controlling emission.

Such an embodiment effectively suppresses crosstalk to the RAM signal to be read out. In the case of concurrent readout of ROM and RAM signals, however, the ROM1 signal becomes flat as a result of negative feedback control as described above, so that it is difficult to obtain the ROM signal.

Therefore, the ROM signal must be detected by an alternative method. The present invention presents means for solution in that regard.

Here, injection current to the semiconductor laser diode LD is modulated through negative feedback with the first ROM signal (ROM1) during reproduction in FIG. 8. That is, the current is optical intensity-modulated in the same pattern as with the ROM signal.

Further, this optical intensity modulation can be detected by the APC photodetector 13. Turning off the APC loop during MPF loop operation results in the phase pit signal being considerably lower than the ROM signal band, rendering the phase pit signal unaffected thereby and thus obtaining the phase pit signal as the second ROM signal (ROM2).

In the present invention, therefore, a clock is generated from this second ROM signal (ROM2) by the synchronous detection circuit 154 and demodulated by the demodulator 155 correspondingly with EFM magnetic field modulation in the main controller 15 shown in FIG. 10, thus obtaining ROM information. Demodulated ROM information is further decrypted by the decrypter 156 correspondingly with encryption by the encrypter 151, thus sending out ROM information as reproduction data.

During concurrent reproduction of ROM and RAM information, rotation of the motor 18 is controlled by the motor driver 36 as part of the seek motion via the motor controller 159 based on the clock reproduced from the second ROM signal (ROM2) obtained from the synchronous detection circuit 154.

Meanwhile, the RAM signal can be detected freely from interference with the ROM signal as the output of the differential amplifier 30 as a result of the ROM signal being flattened by ROM signal negative feedback means including the LD driver 31 to the semiconductor laser diode LD.

The output of the differential amplifier 30 is synchronously detected by a synchronous detection circuit 157, demodulated by a demodulator 158 correspondingly with NRZI modulation, decrypted by the decrypter 156 in the main controller 15, and sent out as the RAM signal.

Here, an embedded clock using the second ROM signal (ROM2) detected by the synchronous detection circuit 154 can be used as reproduced clock as for recording. This leads to automatic changes in signal detection window in the event of rotational variations or deviation from a prescribed linear velocity due to track eccentricity, thus allowing for stable reproduction.

It is to be noted that the main controller 15 in FIG. 10 has a delay circuit 159. The delay circuit 159 is designed to adjust the timing for readout of RAM information. The circuit is provided to adjust the readout timing in order to address slight displacement of the timing for recording RAM information—the displacement conducted during recording of RAM information on top of ROM information to reduce polarization noise caused by phase pit edges that are ROM information—during RAM signal reproduction.

That is, the present inventor discovered that slightly displacing the RAM information recording timing during RAM information recording on top of ROM information can reduce impact of polarization noise caused by phase pit edges—ROM information—given when RAM information is reproduced. While the description has so far focused on NRZI-modulated RAM signal, a similar effect can be obtained by EFM modulation.

Displacing the timing is extremely effective for mark edge recording, a technique effective to achieve higher density. For example in the case of EFM (Eight to Fourteen Modulation) coding for converting 8-bit data to 14-bit run length code for recording—a coding adopted for CD (Compact Disk) whose coding for recording is mark edge recording, letting the data bit length be T, the shortest mark is 3T whereas the longest mark is 11T. Therefore, by displacing the timing integral times of T, there exists a case in which any one edge of the phase pits matches a magneto-optical recording mark edge, although the match is random, because there are nine different mark lengths.

Therefore, the basic value for amount of timing to be displaced is $0T<\Delta T<1T$. Considering generality and expressing the amount of timing using the $\Delta T$, it suffices to displace the timing by $nT+\Delta T$ (where "n" is an integer including zero).

During reproduction, since ROM and RAM information is slightly displaced from each other in recorded positions, it suffices to match the timings using the delay circuit 159 as described above in readout control of the magneto-optical storage apparatus.

During ROM signal reproduction only, the first ROM signal (ROM1) is demodulated and reproduced as ROM information using the second RAM signal (RAM2) as LD feedback signal as with recording since impact on the RAM signal need not be considered.

In the embodiments of the present invention, CLV (Constant Linear Velocity) is employed in which the linear velocity during recording and reproducing is constant across the disk surface, with a command from the motor controller 159 in response to the ROM signal being sent to the motor driver 36 for rotation control of the motor 18. The present invention, however, is not limited thereto and may employ CAV, ZCAV or ZCLV.

As described above, it is possible in the embodiments of the present invention to generate a clock and control the motor driver 36 using the ROM signal, phase pit information, both during recording and reproducing (ROM reproduction, ROM and RAM concurrent reproduction).

During RAM reproduction, in particular, reproduced clock is generated from the ROM signal—phase pit information that will serve as content (music, text, image) used by users—rather than from self-clock even if the RAM signal is of low quality, thus providing a stable reproduced clock irrespective of the RAM signal quality.

Here, the configuration of the storage apparatus according to the present invention shown in FIG. 8 detects the ROM signal from modulated light received by the APC detector 13. This allows for accurate ROM and RAM signal detection without affecting the characteristic of the LD driver (drive circuit) 31.

Figure 6:
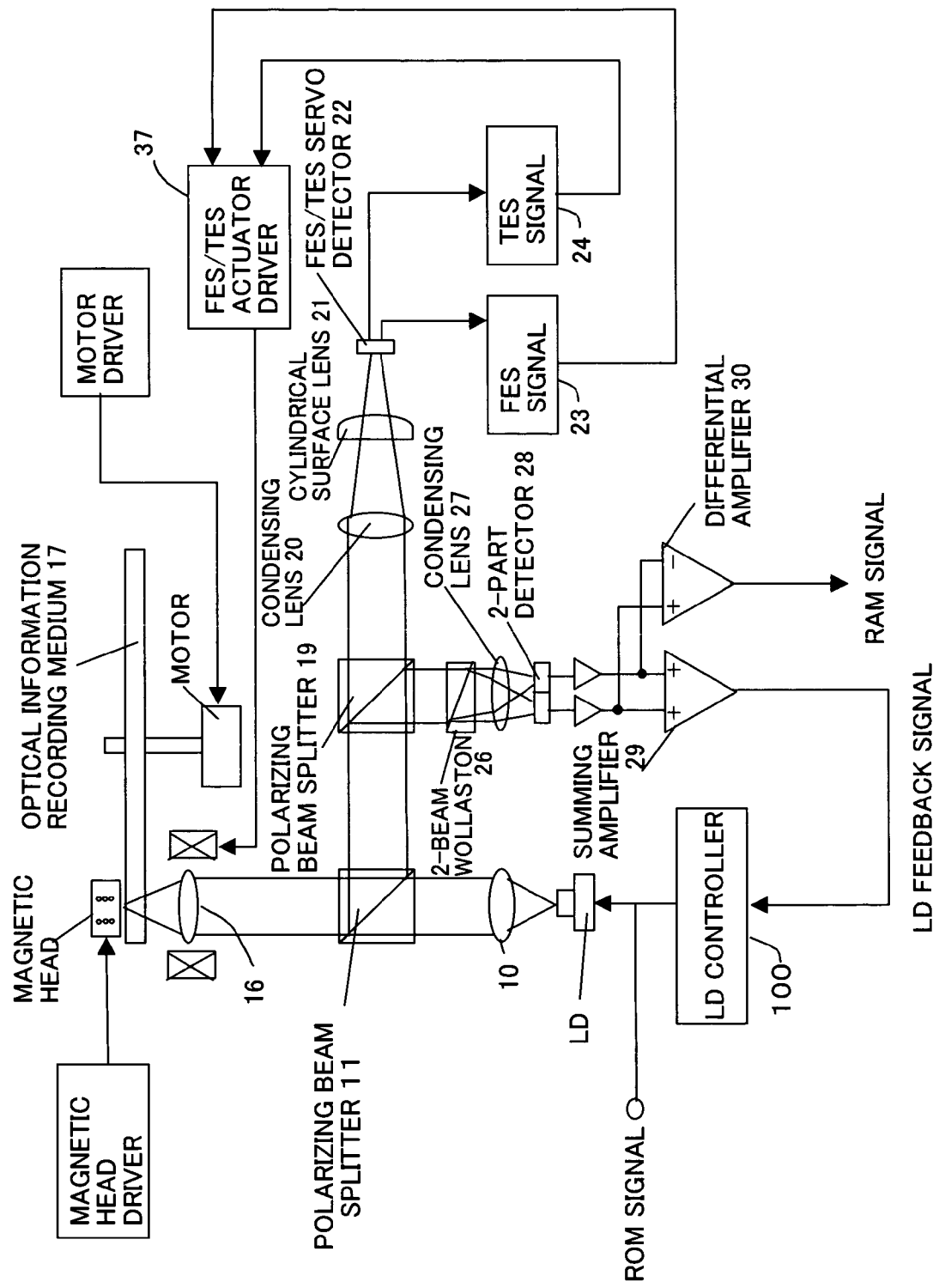
FIG. 6 is a view showing a configuration of conventional storage apparatus of the optical information recording medium employing MPF.
Figure 19:
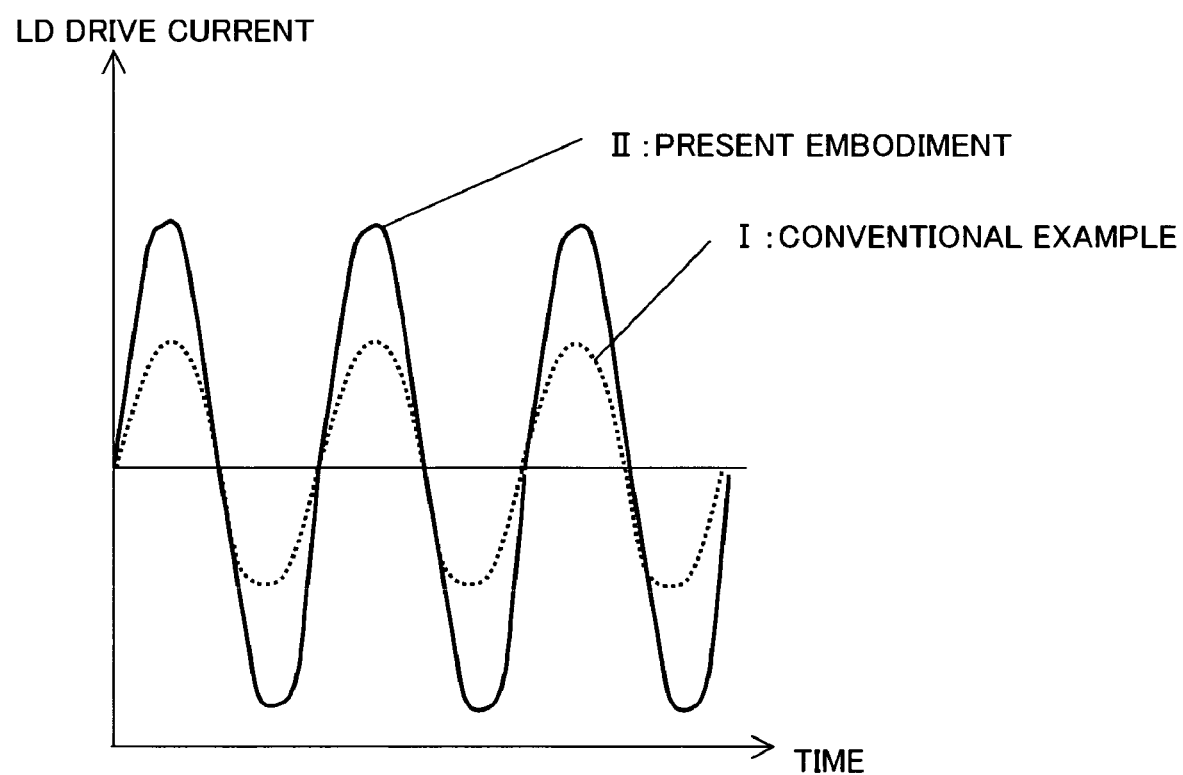
FIG. 19 is a view comparing LD drive currents in the conventional storage apparatus having the configuration of FIG. 6 and the storage apparatus according to an embodiment of the present invention under the same conditions.

FIG. 19 compares LD drive current under the same conditions between the conventional storage apparatus whose configuration is shown in FIG. 6 and the storage apparatus of the embodiment according to the present invention. In making comparison, detection of LD drive current itself makes it impossible to determine the impact on LD drive circuit current. For this reason, the light quantity reflected by the polarizing beam splitter 11 was also monitored in the conventional example.

As is apparent from FIG. 19, the modulated component in the amount of LD drive current is larger in the embodiment II according to the present invention than in the conventional example I. It has been confirmed that increasing the circuit's amplification factor for larger modulated component in the amount of LD drive current results in oscillation.

Thus, monitoring LD drive current directly as in the conventional example suppresses the LD feedback characteristic. FIG. 20 shows results of comparison of ROM and RAM signals' CNR and noise level with the conventional example. At this time, the following conditions were set for the storage apparatuses and the information recording medium:

LD wavelength λ=785 nm
Objective lens numerical aperture NA=0.55
Reproduction beam irradiation power Pr=1.5 mW
Irradiation power during RAM recording Pr=7.0 mW
Magnetic field applied during RAM recording Hex=±2000e
Medium linear velocity L=5 m/sec
Track pitch 1.6 µm
ROM pit length 0.83 µm (single mark repeated)
ROM pit depth 43 nm
ROM pit width 0.38 µm
RAM pit length 0.83 µm It is understandable that, in the embodiment, CNR and noise level for ROM and RAM alike are improved over those in the conventional example and that ROM and RAM signals can be accurately reproduced by the present invention.

Here, advantages of the magneto-optical recording medium according to the present invention, a medium allowing for concurrent reproduction of ROM and RAM information, will be examined below particularly from the viewpoints of security and storage capacity.

In the configuration of the main controller 15 shown in FIG. 10, the main controller 15 has the encrypter 151 and the decrypter 156. This makes it possible to readily ensure data security at low cost as a hardware configuration by using the magneto-optical information recording medium and the storage apparatus according to the present invention as shown in FIG. 8 if ROM information in the magneto-optical information recording medium proposed by the present inventor is confidential information (first digital image of original picture, personal documents, official documents).

That is, unrewritable critical information is recorded as ROM information and as phase pits. Further, RAM information is converted to encrypted data such as Triple Des by the encrypter 151 according to the ROM information in the RAM portion located at a region physically identical to where ROM information is recorded. The generated encrypted data is magneto-optically recorded.

This makes it possible to concurrently access both critical ROM data and its encrypted data, thus taking full advantage of the size of a single optical information recording medium.

By using encrypted information as electronic watermark, it is possible to instantly determine whether ROM portion information is authorized.

FIGS. 21A and 21B show optical systems to examine how to irradiate laser beam to the optical information recording medium in the storage apparatus shown in FIG. 8. FIG. 21A is a method that has often been used in which a laser light is irradiated from the side of a clear substrate 170 of the optical information recording medium 17. In this method, the laser beam reaching a recording layer 171 must transmit the clear substrate 170.

In the method, reproduction is achieved via the clear substrate 170, keeping the read characteristic degradation small in the event of dust attached to the substrate or scratches thereon. However, optical aberration is large as a result of tilting of the substrate, making it impossible to increase the numerical aperture of the objective lens.

Therefore, the present inventor proposes the read method shown in FIG. 21B in the storage apparatus shown in FIG. 8 and employs this method. That is, the laser light from the semiconductor laser diode LD is directly irradiated onto the recording layer 171, thus detecting information. Therefore, the method is resistant to tilting of the clear substrate 170, making it possible to increase the numerical aperture of the objective lens for high-density recording and reproducing.

Here, the present inventor examined a disk-shaped optical information recording medium suited to recording and reproducing by the storage apparatus according to the present invention shown as an embodiment in FIG. 8.

Figure 22:
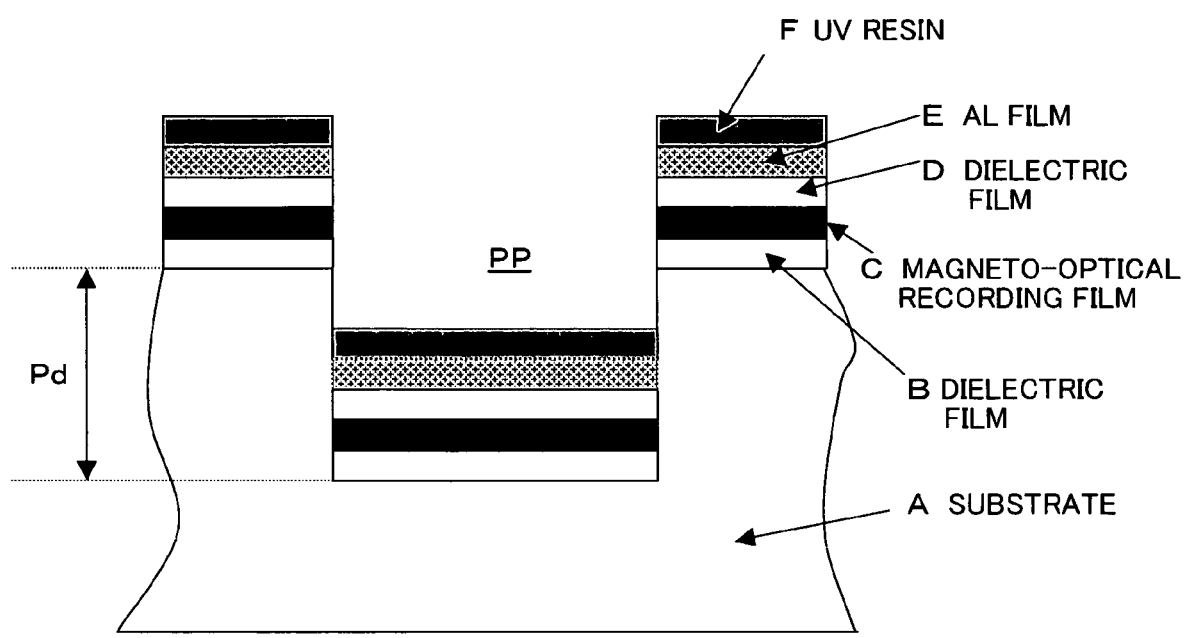
FIG. 22 is a cross-sectional view of a phase pit PP in the direction of the radius in the disk-shaped optical information recording medium according to the present invention.

FIG. 22 is a sectional view that cuts through a phase pit PP—ROM information—in the direction of the radius in the disk-shaped optical information recording medium proposed by the present inventor.

The optical information recording medium consists of the disk-shaped polycarbonate substrate A with the dielectric layer B, made of SiN, etc., formed thereon first, followed by formation of the magneto-optical recording film C made of TbFeCo, etc., the dielectric film D and the Al reflecting film E and finally by formation of lines of the phase pits PP on the optical information recording medium coated with the overcoat F made of UV-hardening resin.

Figure 2:
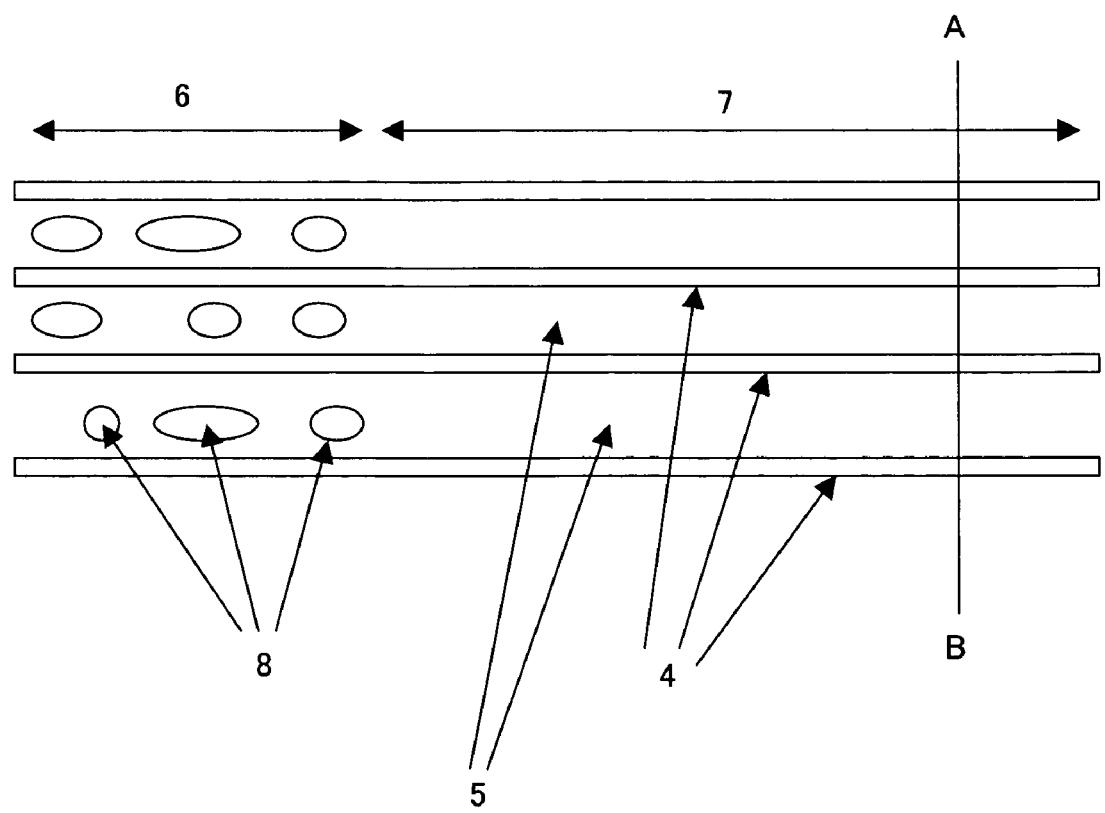
FIG. 2 is part of an enlarged plan view of a user area 3 in a magneto-optical disk memory shown in FIG. 1.
Figure 3:
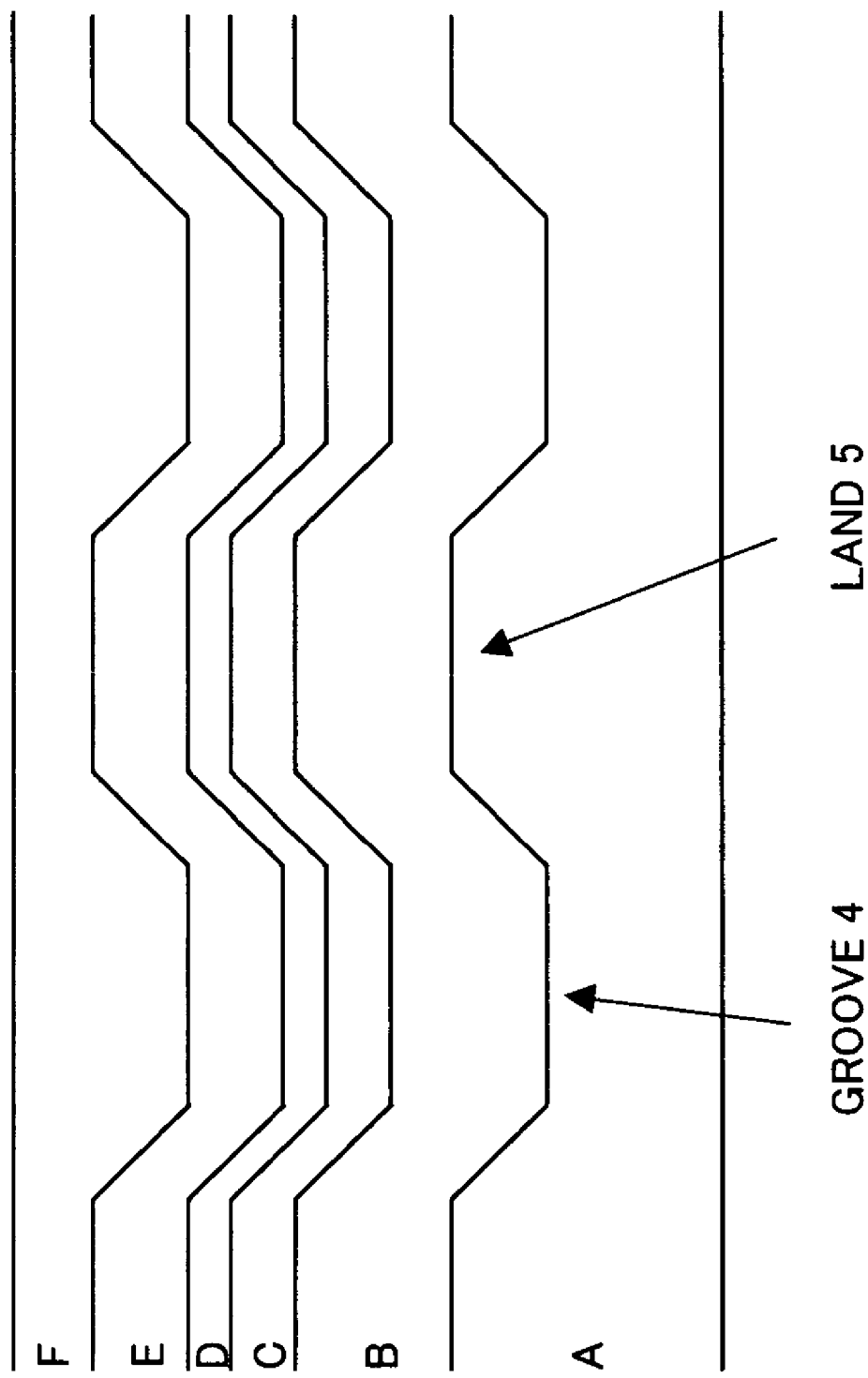
FIG. 3 is a view showing cross-sectional structure in the direction of the radius along line A-B in FIG. 2.
Figure 4:
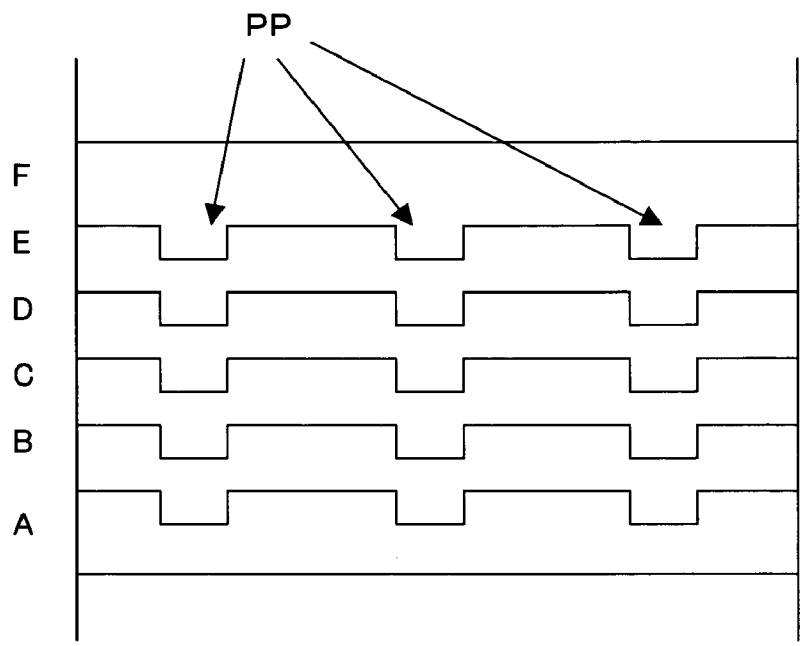
FIG. 4 is a view showing cross-sectional structure of an optical information recording medium capable of concurrent reproduction of ROM-RAM.
Figure 5:
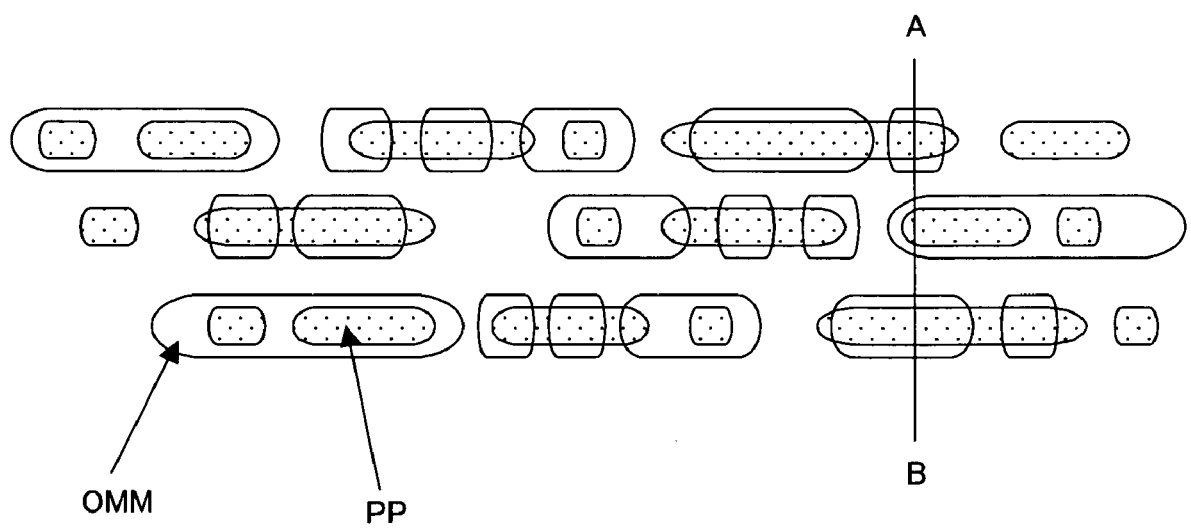
FIG. 5 is a view describing ROM and RAM information recording on the optical information recording medium having the construction of FIG. 4.

It is to be noted that while formation of grooves as is done in FIG. 5 is not necessary, it is naturally possible to form grooves as shown in FIG. 2 to ensure more reliable track control, thus performing magneto-optical recording on lands formed between the grooves. Alternatively, it is also possible to spread the width of the grooves to as wide as that of the lands, thus allowing for magneto-optical recording on the grooves, as well.

Figure 23:
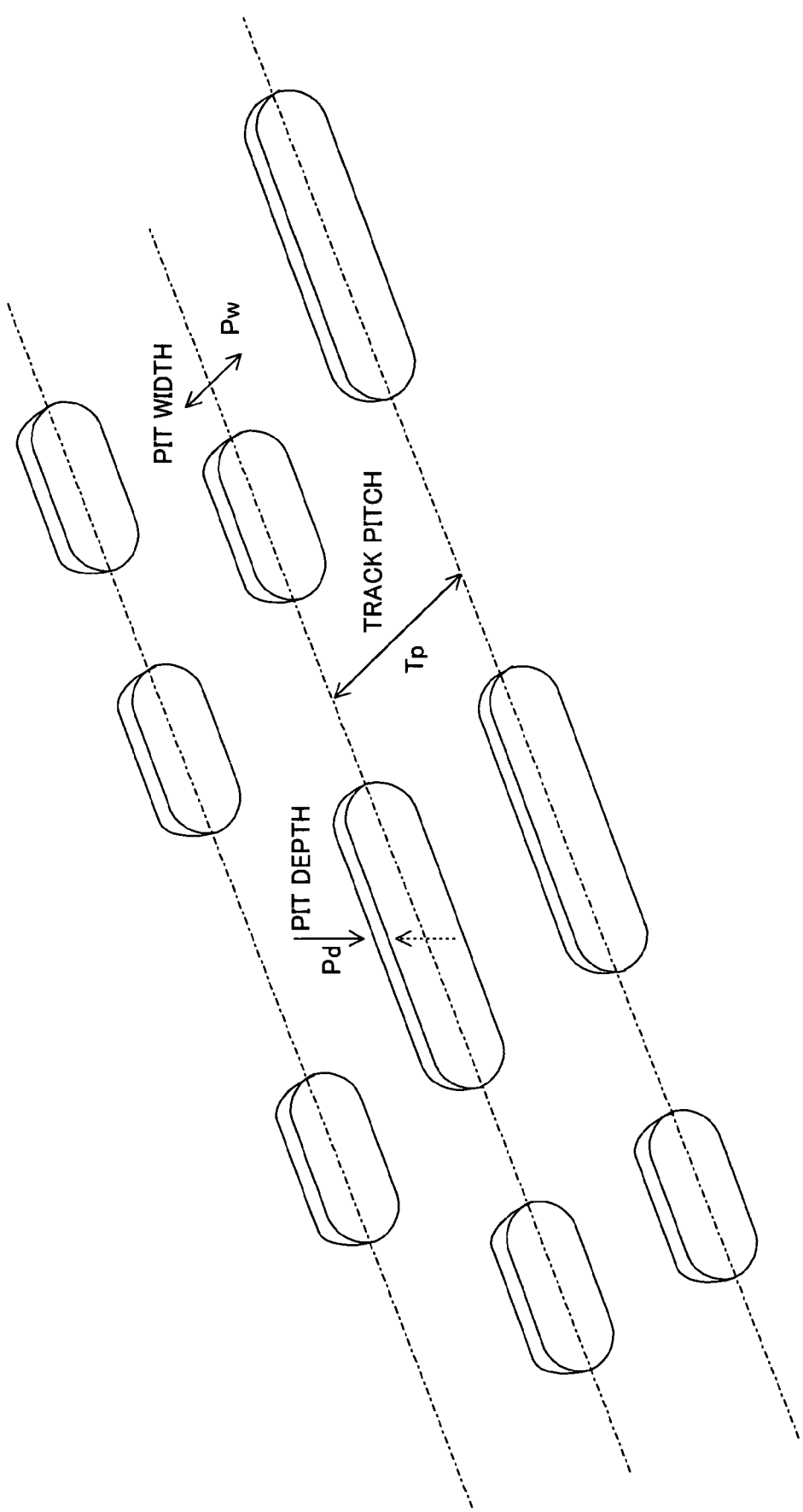
FIG. 23 is a view showing shapes of phase pits that are a prerequisite for understanding features of the optical information recording medium recorded/reproduced by the storage apparatus according to the present invention.

FIG. 23 is a view showing shapes of phase pits that are a prerequisite for understanding features of the optical information recording medium proposed by the present inventor. In FIGS. 22 and 23, a reference symbol Pd denotes the phase pit depth, namely, the optical depth. A track pitch Tp refers to the gap between phase pits in the direction of the radius, whereas a pit width Pw refers to the phase pit width in the direction of the radius.

Here, the present inventor has confirmed as a result of study that pit shape-based modulation and tracking error signal (TES) are dependent on the pit depth Pd and the pit width Pw.

The constructions of the samples used for the confirmation are as follows. That is, a plurality of substrates with a plurality of different phase pits were made by injection molding as the samples using polycarbonate materials so as to have a thickness of approximately 1.2 mm. The layered construction formed on these substrates is a substrate/SiN/TbFeCo/GdFeCo/Sin/Al. The GdFeCo layer was inserted to boost the Kerr rotational angle.

Figure 24:
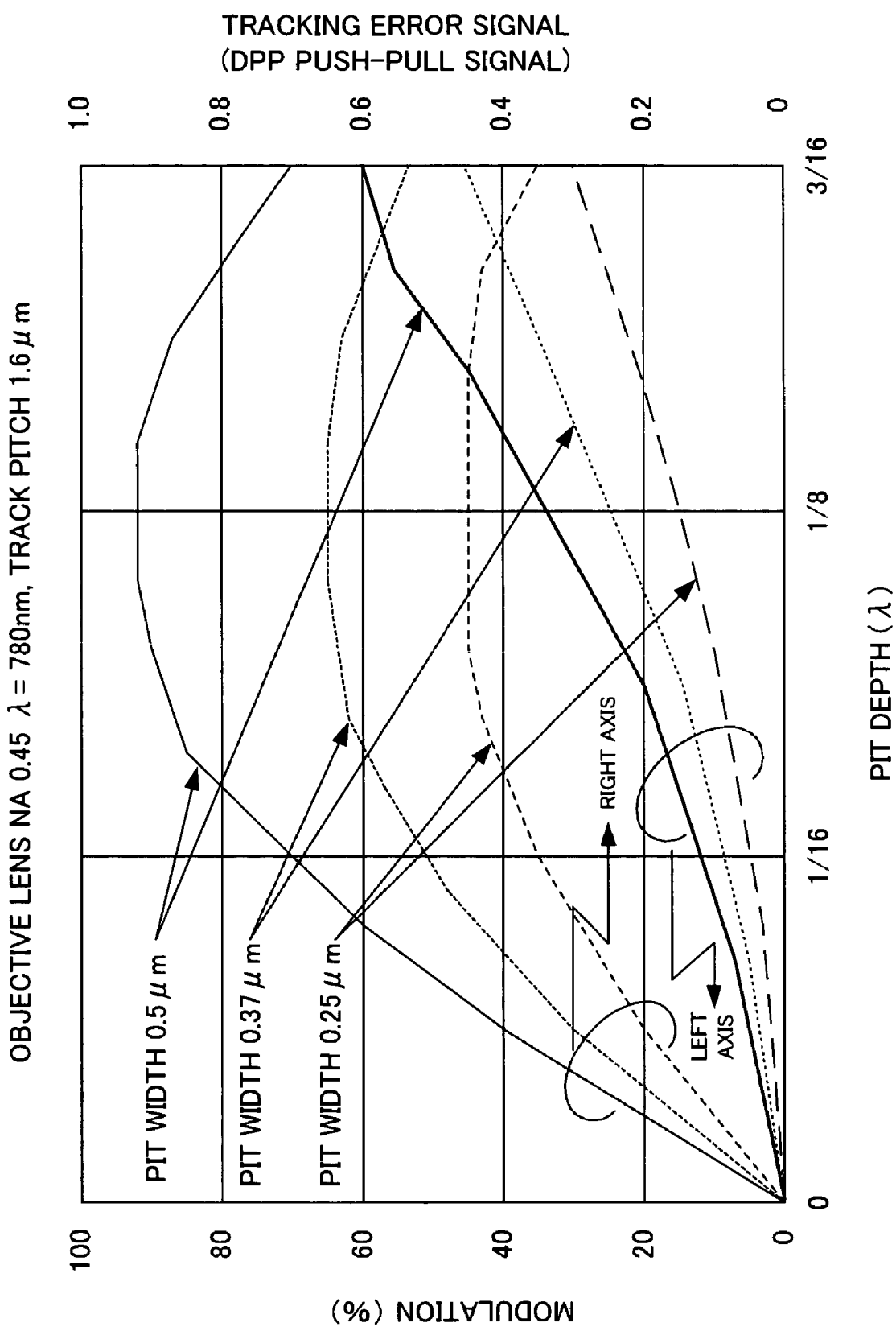
FIG. 24 is a graph showing dependency of modulation and tracking error signal (TES) on a pit depth PD and a pit width Pw measured by the present inventor.

FIG. 24 is a graph showing dependency of modulation and tracking error signal (TES) on the pit depth Pd and the pit width Pw, measured by the present inventor through simulation of the samples. The horizontal axis represents the pit depth Pd when the wavelength of the information detection (readout) light is $\lambda$, namely, the optical depth. Meanwhile, the vertical axis on the left represents the magnitude of optical intensity modulation.

Figure 7:
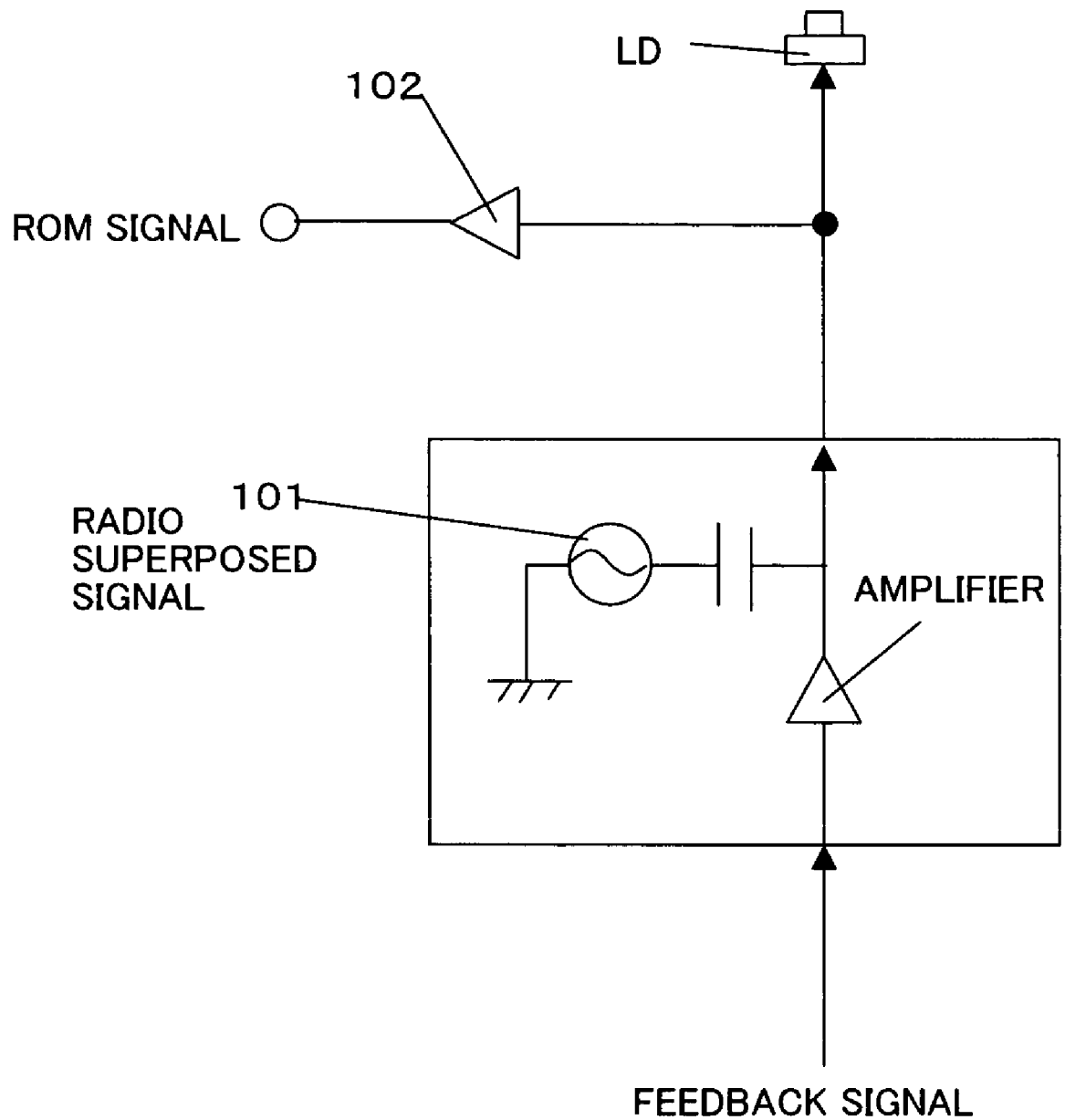
FIG. 7 is a view showing the configuration of the LC controller 100 in FIG. 6.

In FIG. 24, tracking error signal is that determined by push-pull method described with reference to FIG. 7. Here, tracking error signal that does not result in read error is roughly 0.5 or more.

In FIG. 24, therefore, the pit depth Pd is $\lambda/10$ to $\lambda/4$ and the pit depth Pw is 0.29 or more when post-AGC tracking error signal (refer to the scale on the right-hand vertical axis) is 0.5 or more.

On the other hand, the present inventor has discovered as a result of various studies and evaluations that phase pit modulation affects ROM and RAM signal jitters. That is, the present inventor has discovered that there is a problem specific to concurrent ROM-RAM, namely, the problem lies in that ROM and RAM signals are detected concurrently. While, in the case of detection of ROM or ROM signal only, it suffices to examine a modulation suited to each signal, it is necessary to achieve, in this case, a modulation that is commensurate with detection of both signals.

The table in FIG. 25 shows values measured when the optical information recording medium is in CD (Compact Disk) format, with the shortest mark length of 0.833 μm and the track pitch of 1.6 μm and further with the objective lens numerical aperture NA of 0.50 and the laser wavelength of 785 nm.

Here, jitter is stipulated to be 40 ns or less for CD-MO (magneto-optical recording medium) and 30 ns or less for CD-WO (rewritable magneto-optical recording medium) as requirements. Therefore, it is possible to keep the block error rate below 3% by requiring jitter to be 35 ns or less for concurrent ROM-RAM having the above two functions, for which the present invention is targeted.

That is, letting data-to-data jitter be σ and expressing it as clock-to-data jitter ratio relative to window width, namely, clock period (T=231 ns), will result in $\sigma/(T_y/2) \cdot 100$. The jitter ratio of 15% or less is known to be a standard value and generally unproblematic. Incidentally, if the jitter of 35 ns or less is demanded for concurrent ROM-RAM magneto-optical recording medium, the jitter ratio is calculated to be 10.7%, which is understandably not problematic in practical terms.

From the table of FIG. 25, therefore, the phase pit modulation whose allowable jitter is 35 ns or less can be theoretically evaluated to fall within approximately 15–25% range. Referring to FIGS. 21A and 21B based on the evaluation, the pit width Pw is approximately 0.25 μm to 0.37 μm and the pit depth Pd is about $\lambda/10$ to $\lambda/8$ in order for the phase pit modulation (refer to the left-hand vertical axis) to fit into the 15–25% range.

Therefore, it is understandable, in consideration of values needed for the characteristics of the apparatus and the medium and for mass-producibility, that the pit depth Pd and the pit width Pw that meet both requirements—post-AGC tracking error signal of 0.5 or more and phase pit modulation of 15 to 25%—are approximately $\lambda/10$ to $\lambda/8$ and 18% to 24%, respectively.

By recording ROM information so as to meet the aforementioned requirements in respect of the pit depth Pd and the pit width Pw presented by the present inventor, it is possible to solve the problem not adequately addressed by negative feedback control of the semiconductor laser emission in the prior art for reducing impact of optical intensity modulation during concurrent readout of ROM and RAM information.

It is to be noted that while the pit width Pw is dependent on the track pitch Tp, the detection light wavelength $\lambda$ and the optical system construction, it is possible to satisfy the requirements of keeping the tracking signal amplitude and the modulation within given ranges in the aforementioned pit depth range between $\lambda/10$ and $\lambda/8$ by bringing the ratio of the pit width Pw to the track pitch Tp roughly in the 18–24% range.

Figure 26:
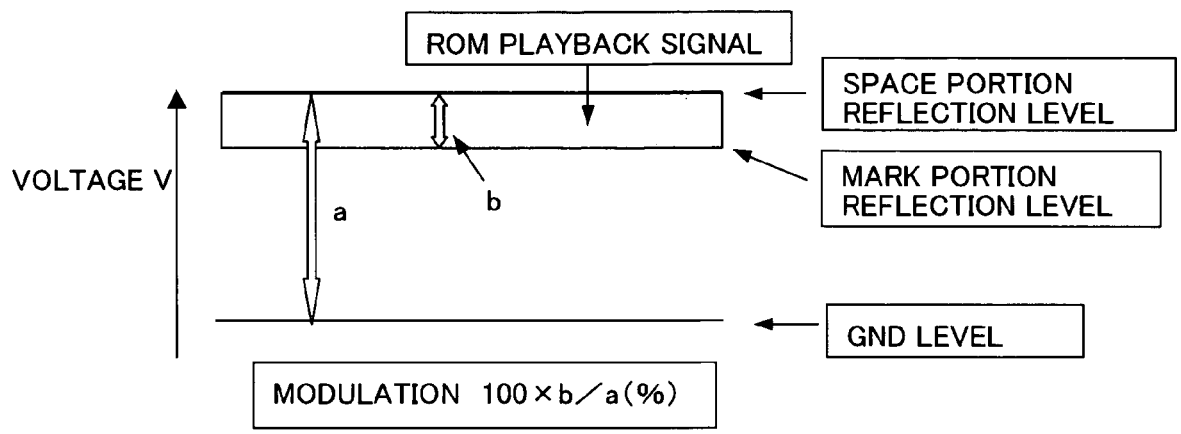
FIG. 26 is a view showing a modulation measurement method.

Here, modulation was specifically determined using a sample. To measure modulation, the sample was set on a tester and rotated followed by tracking of the phase pits PP, thus reproducing ROM signal of the phase pits PP. At this time, a space portion reflection level a and a mark portion reflection level b of the ROM reproduction signal are compared relative to a ground level GND as shown in FIG. 26, thus defining modulation by the following equation:

Modulation=$b/a \times 100(\%)$

Based on this definition of modulation, the aforementioned sample was attached to the tester for ROM and RAM jitter measurements.

Figure 27:
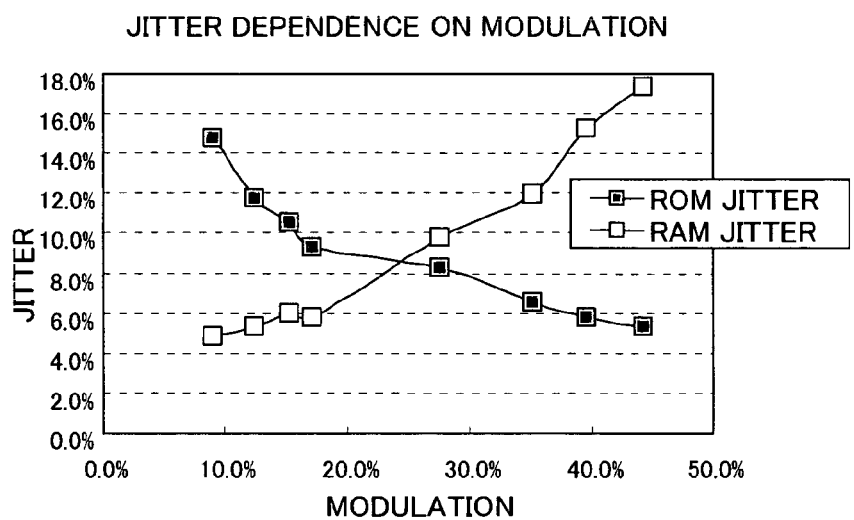
FIG. 27 is a graph showing dependency of measured ROM and RAM jitters on modulation.

FIG. 27 is a graph showing dependency of measured ROM and RAM jitters on modulation under the following tester, recording and reproducing conditions.

Tester conditions: Laser wavelength=650 nm, NA=0.55, linear velocity=4.8 m/s, ShibaSoku LM530C used as magnetic field modulation recording testing device Recording conditions: Recording laser power Pw=6.5 mW, DC emission, EFM random pattern recorded, shortest mark=0.832 μm Reproduction conditions: Reproduction power Pr=1.5 mW, no reproduction magnetic field, polarized vertically relative to the track It is understandable from FIG. 27 that to obtain a jitter smaller than the jitter ratio of 15%, a ratio generally viewed as the maximum permissible value, it suffices to bring modulation in the range from 10% to 37%. Further, while only variations during reproduction need be considered for ROM signal, variation factor during magneto-optical recording must be considered as well as that during reproduction for RAM signal. Therefore, it is necessary to factor in the decline in jitter due to variations in recording magnetic field and recording power as various variation factors to be factored in during actual use. For instance, if the jitter ratio is set to 10% or less, it is preferred in terms of practical use that modulation be 15% to 25%.

Figure 28:
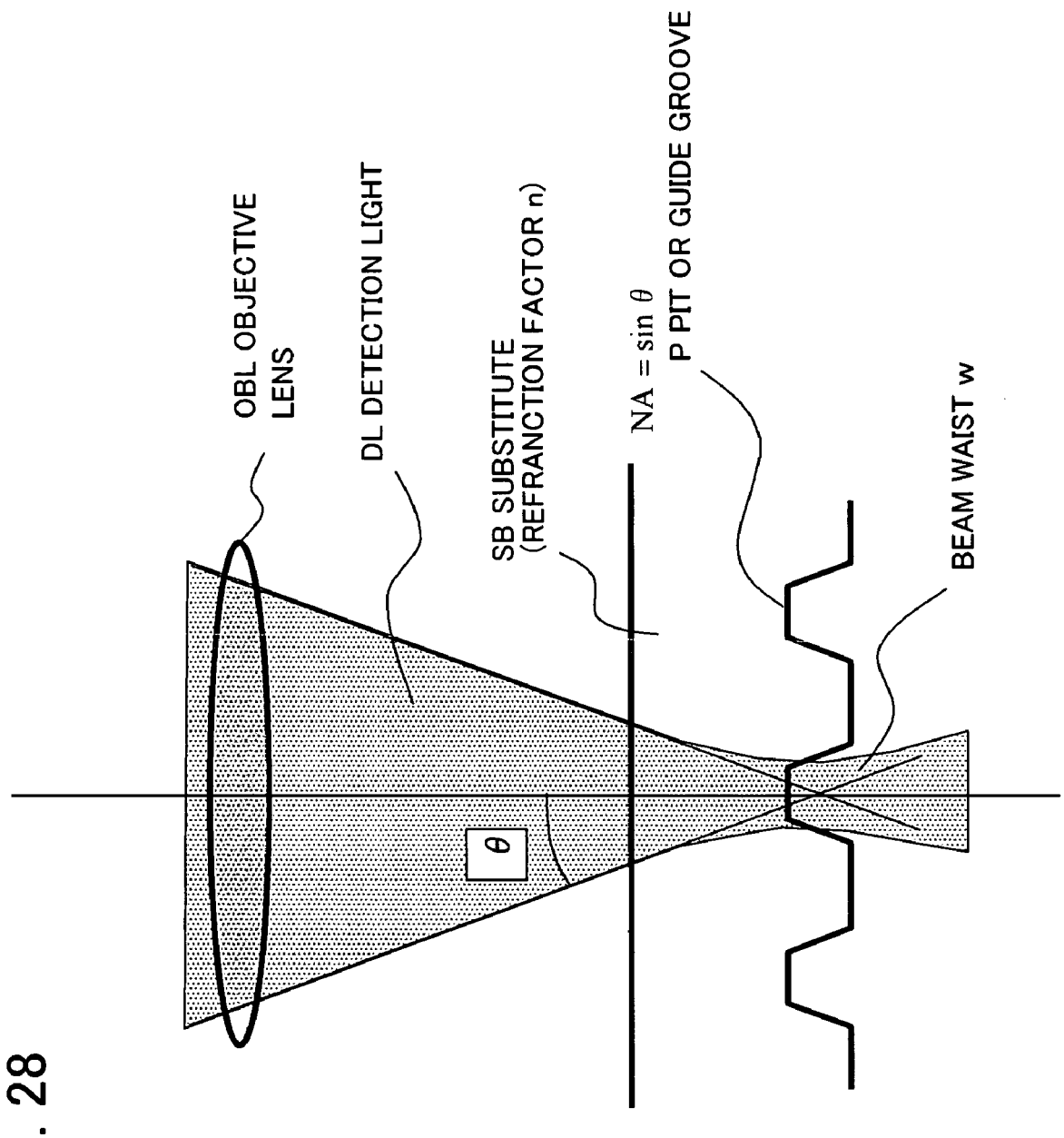
FIG. 28 is a sectional view in the tangential direction of the detection light beam intensity shape and the pit shape.

The aforementioned modulation and pit shape will be further examined. In the detection system of the disk-shaped optical recording medium, a spot with a beam waist W, expressed roughly by the following equation, is formed on the optical recording medium according to the numerical aperture NA of an objective lens OBL and the wavelength $\lambda$ of a detection light in FIG. 28 that is a sectional view in the tangential direction of the detection light beam intensity shape and the pit shape. The beam waist W is the $1/e^2$ width from the peak intensity position to the position where the intensity is half the peak intensity.

$$W = 2\pi\nu/\pi NA \quad (1)$$

where $NA = \sin\theta$

The practical beam waist W changes slightly depending on the distribution of optical intensity passing through the objective lens, the surface accuracy of optical components, etc. As a result, modulation and tracking error signal amount change depending on the optical system for the pit shape of the optical information recording medium prescribed in the present invention.

Figure 29:
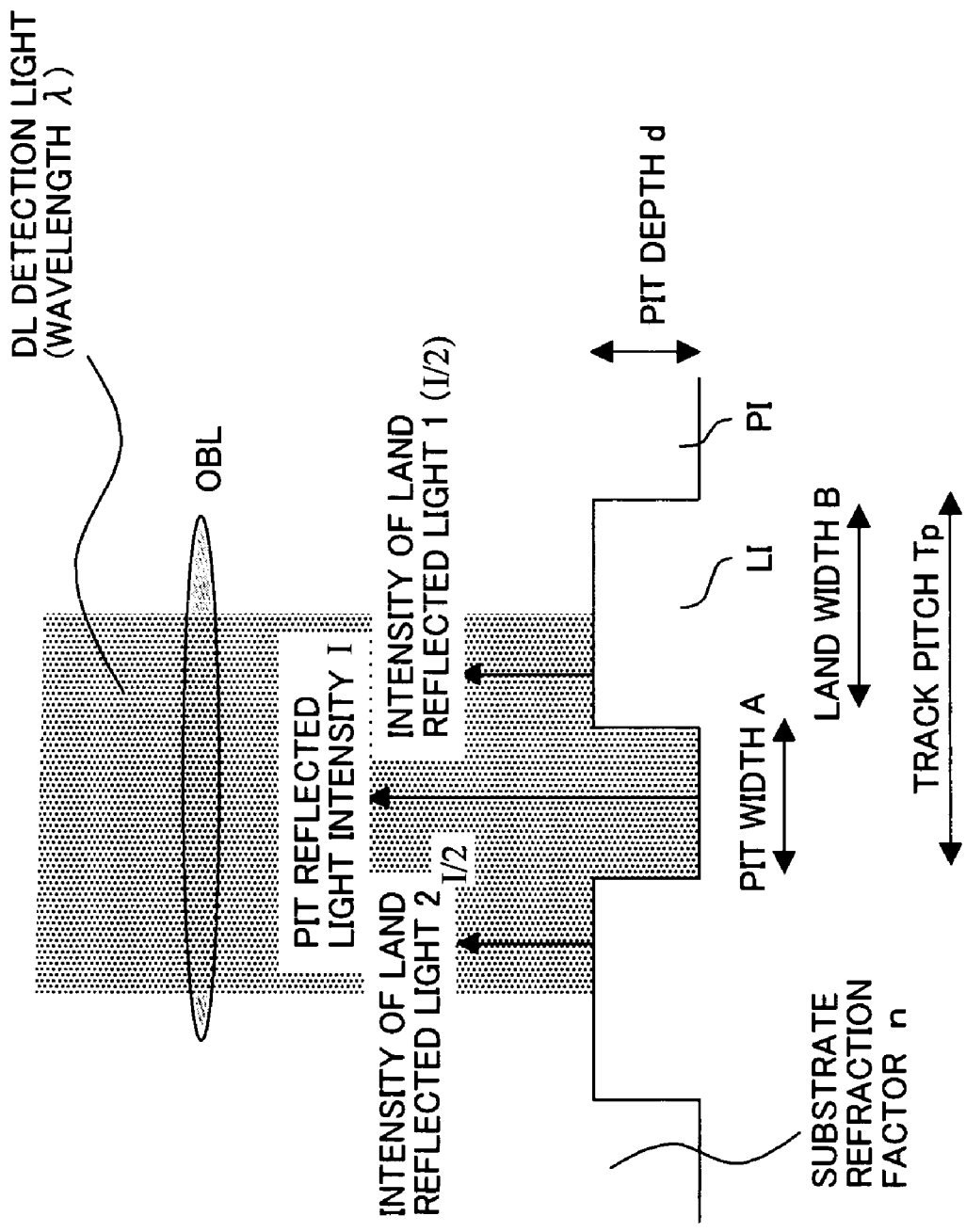
FIG. 29 is a view describing an approximation equation of modulation.

In general, the relationship between a modulation Im and pit shape can be approximately expressed by the following equation in the arrangement shown in FIG. 29:

$$1 - Im = (A^2 + B^2 + 2AB \cos(\Delta))/(A+B)^2 \quad (2)$$

where $\Delta = 4\pi dn/\lambda$, A=pit width, B=land width

Figure 30:
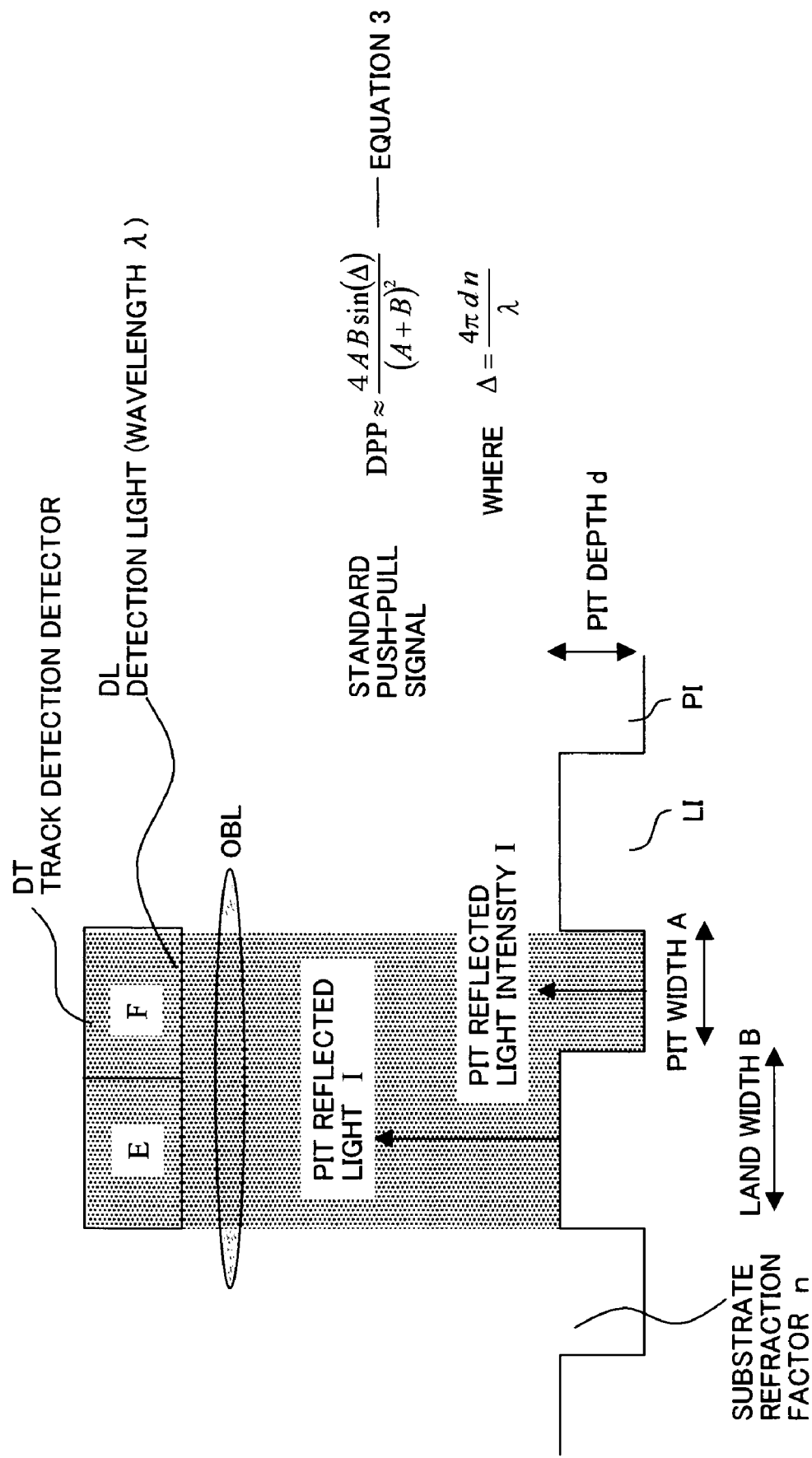
FIG. 30 is a view describing an approximation equation of push-pull signal.

While the light quantities reflected by a pit portion PI and a land portion LI are assumed to be the same here, the light quantities in the land portion LI and the pit portion PI are in actuality different depending on the beam spot shape. In general, a tracking signal DPP generated by push-pull method—a signal standardized for pit shape—is approximately expressed by an equation (3) in the arrangement shown in FIG. 30.

$$DPP = 4AB \sin(\Delta)/(A+B)^2 \quad (3)$$

where $\Delta = 4\pi dn/\lambda$, A=pit width, B=land width

As is understandable from these equations, it suffices, in order to boost modulation, to bring a pit depth d close to $\lambda/4$ and the ratio of the pit width A to the land width B close to 1:1.

Figure 31:
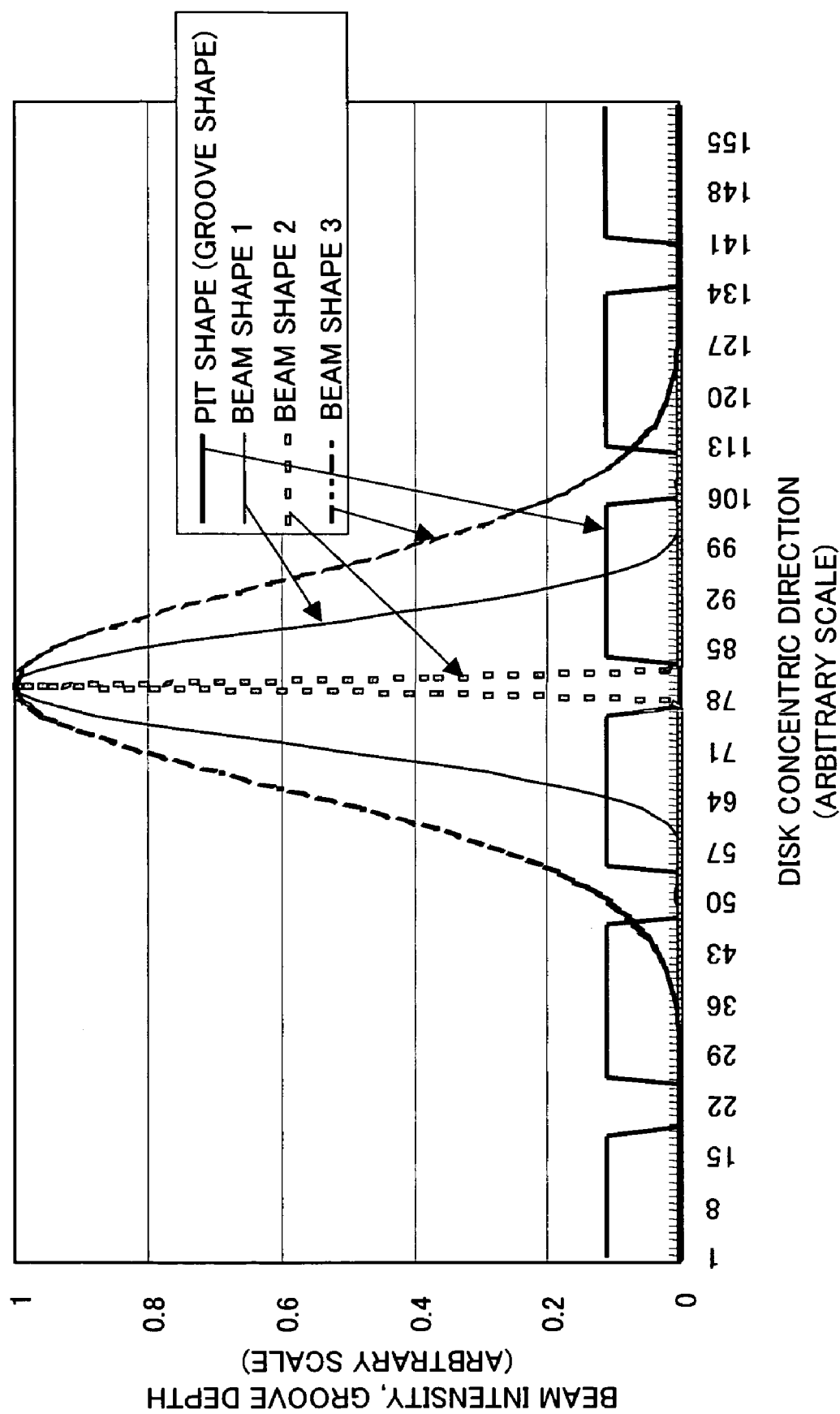
FIG. 31 is a cross-sectional view in the tangential direction of the light beam spot shape and the pit shape.

Specifying a pit shape alone does not, in actuality, allow a desired modulation to be obtained due to the optical system. FIG. 31 shows spot shape statuses caused by different optical systems in the concentric direction of the optical information recording medium prescribed in the present invention. It is apparent that beam spots such as those having beam shapes 2 and 3 do not provide a desired modulation or push-pull signal. A beam shape 1 represents a preferred beam spot shape in the optical system in the application of the present invention. In a practical optical system, the beam spot shape is prescribed, for the most part, by the light source's intensity distribution, the objective lens numerical aperture and the wavelength of the light used, and the present invention presents combinations that provide the same level of the beam waist W diameter as the track pitch for recording and reproducing of the optical information recording medium.

Pit shape is the ratio of pit width to track pitch, and it suffices in the application of the present invention to prescribe the pit depth alone.

Here, although described for use with the optical information recording medium capable of concurrent readout of ROM-RAM, the storage apparatus of the present invention is not limited thereto in its application and may be rendered compatible with ordinary recording media such as CD and CD-R. In this case, such compatibility can be achieved by providing a control track at the inner or outer perimeter or at a desired position of the magneto-optical recording medium, allowing the apparatus to recognize that a concurrent ROM-RAM is handled. It is possible, based on whether synchronization can be confirmed between ROM and RAM signals in the control track, to determine whether a concurrent ROM-RAM magneto-optical recording medium or an ordinary recording medium such as CD or CD-R is handled.

INDUSTRIAL APPLICABILITY

As described above with reference to the accompanying drawings, the present invention provides a storage apparatus capable of at least record or reproduction that is compatible with optical information recording media capable of stable reproduction of RAM information during concurrent read-out of ROM and RAM information.

Further, the present invention provides a storage apparatus capable of at least record or reproduction that can reduce polarization noise generated by phase pit edges—ROM information—and that is compatible with optical information recording media.

The invention claimed is:

1. A storage apparatus capable of at least record or reproduction of an optical information recording medium in which ROM information is recorded by phase pits and in which RAM information is recorded on top of a recording region of the phase pits, the storage apparatus comprising:
   a light source for emitting a light beam;
   a recording information detection system for detecting reflected light of the light beam from the optical information recording medium and generating signals corresponding to ROM and RAM information;
   an optical intensity detection system for detecting intensity of the light beam from the light source;
   a driver for controlling the intensity of light beam emission of the light source; and
   a controller for providing via the driver a negative feedback control of the intensity of emission of the light source using ROM signal in the output of the recording information detection system when the output of the recording information detection system simultaneously contains ROM and RAM signals corresponding to ROM and RAM information, and for providing control so as to obtain read-out reproduction ROM signal from the output of the optical intensity detection system.

2. The storage apparatus capable of at least record or reproduction according to claim 1, wherein the optical information recording medium is made up of a clear substrate and a magnetic recording film layer formed thereon, the storage apparatus further comprising:
   a head unit having a magnetic head for magnetic recording to the optical information recording medium and an objective lens for focusing the light beam during magnetic recording or reproducing, wherein the magnetic head is located opposite to the side of the magnetic recording film layer of the optical information recording medium, so that a light beam focused with the objective lens is irradiated on the magnetic recording film layer.

3. The storage apparatus capable of at least record or reproduction according to claim 1, further comprising an error correction control unit that generates an error correction signal by combining ROM information recorded with the phase pits and RAM information to be recorded, to thereby control magnetic recording thereof on top of the ROM information as the RAM information.

4. The storage apparatus capable of at least record or reproduction according to claim 1, wherein different recording modulation systems are used for the ROM and RAM information.

5. The storage apparatus capable of at least record or reproduction according to claim 4, wherein the optical information recording medium is made up of a clear substrate and a magnetic recording film layer formed thereon, wherein magnetic field modulation system is used as a recording modulation system of the RAM information, and wherein recording is performed by irradiating a pulsed light to the magnetic recording film layer.

6. The storage apparatus capable of at least record or reproduction according to claim 1, further comprising a delay processing unit that reproduces a clock from the ROM information and that controls the timing for magnetically recording the RAM information on the region of the ROM information with reference to the reproduced clock.

7. The storage apparatus capable of at least record or reproduction according to claim 6, wherein the timing for magnetically recording the RAM information is delayed by the delay processing unit by nT+ΔT (where 'n' is an integer including zero, and 'T' is a data bit length) relative to the clock reproduced from the ROM information.

8. The storage apparatus capable of at least record or reproduction according to claim 1, wherein the optical information recording medium of at least record or reproduction comprises a substrate having a ROM region where phase pits serving as ROM data are formed and a magneto-optical recording film for recording RAM data that is formed in a region corresponding to the ROM region of the substrate, with the optical depth of the phase pits being approximately λ/8 to λ/10 (where the λ is the wavelength of the laser used for recording/reproducing), and with modulation of the phase pits being 10% to 37%.

9. The storage apparatus capable of at least record or reproduction according to claim 8, wherein the ratio of width of the phase pit to track pitch in the optical information recording medium is roughly 18% to 24%.

10. A storage apparatus capable of at least record or reproduction of an optical information recording medium which comprises a substrate having a ROM region where phase pits serve as ROM data and a magneto-optical recording film for recording RAM data on a region corresponding to the ROM region of the substrate, with the optical depth of the phase pits being approximately λ/8 to λ/10 (where the λ is the wavelength of the laser used for recording/reproducing), and with modulation of the phase pits being 10% to 37%, comprises:
  a light source for generating a light beam to be irradiated to the optical information recording medium;
  a first detection system for detecting a ROM signal of the reflected light beam by the optical information recording medium; and
  a second detection system for detecting a RAM signal of the reflected beam by the optical information recording medium.

11. A storage apparatus capable of at least record or reproduction of an optical information recording medium in which ROM information is recorded with phase pits and RAM information is recorded on top of a recording region of the phase pits, comprises:
  a light source for emitting a light beam;
  a recording information detection system for detecting reflected light beam by the optical information recording medium, and generating signals corresponding to ROM and RAM information; and
  a delay processing unit that reproduces a clock from the ROM information, and controls the timing for magnetically recording the RAM information on top of the ROM information with reference to the reproduced clock.

12. The storage apparatus capable of at least record or reproduction according to claim 11, wherein the timing for magnetically recording the RAM information is delayed by the delay processing unit by nT+ΔT (where 'n' is an integer including zero, 'T' is a data bit length) relative to the clock reproduced from the ROM information.

* * * * *